United States Patent
Hashizume

(10) Patent No.: US 11,237,469 B2
(45) Date of Patent: Feb. 1, 2022

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Toshiaki Hashizume, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 52 days.

(21) Appl. No.: 16/820,922

(22) Filed: Mar. 17, 2020

(65) Prior Publication Data

US 2020/0301261 A1  Sep. 24, 2020

(30) Foreign Application Priority Data

Mar. 18, 2019  (JP) .............................. JP2019-050086

(51) Int. Cl.
*H05B 33/10* (2006.01)
*G03B 21/20* (2006.01)

(52) U.S. Cl.
CPC ................. *G03B 21/204* (2013.01)

(58) Field of Classification Search
CPC .................................................. G03B 21/204
See application file for complete search history.

(56) References Cited

U.S. PATENT DOCUMENTS

| | | | | |
|---|---|---|---|---|
| 5,844,361 | A * | 12/1998 | Petersen | C09K 11/7771 313/495 |
| 6,604,972 | B1 * | 8/2003 | Yamano | H01J 9/20 313/495 |
| 6,812,636 | B2 * | 11/2004 | Porter | H01J 1/70 313/495 |
| 9,715,043 | B2 * | 7/2017 | Ogane | G02B 5/0247 |
| 10,580,944 | B2 * | 3/2020 | Furuyama | G03B 21/204 |
| 2011/0001422 | A1 * | 1/2011 | Aanegola | H01L 25/0753 313/501 |
| 2012/0267999 | A1 * | 10/2012 | Sakuta | C09K 11/7739 313/503 |
| 2013/0140983 | A1 * | 6/2013 | Ling | H01L 33/508 313/512 |
| 2013/0147348 | A1 * | 6/2013 | Motoya | H05B 33/12 313/512 |
| 2015/0226389 | A1 * | 8/2015 | Kasugai | G02B 5/3025 353/31 |
| 2015/0276177 | A1 | 10/2015 | Maeda et al. | |

(Continued)

FOREIGN PATENT DOCUMENTS

JP   2015-197474 A   11/2015
JP   2017-111176 A   6/2017

*Primary Examiner* — Andrew J Coughlin
(74) *Attorney, Agent, or Firm* — Oliff PLC

(57) ABSTRACT

The wavelength conversion element includes a phosphor layer having a plurality of phosphor particles and a binder configured to bind one of the phosphor particles adjacent to each other and another of the phosphor particles adjacent to each other out of the plurality of phosphor particles, an antireflection layer disposed on an incident side of the excitation light with respect to the phosphor layer, and a substrate provided with the phosphor layer, wherein the binder includes glass, and the binder binds a part of a surface of the one of the phosphor particles and a part of a surface of the another of the phosphor particles to each other.

19 Claims, 24 Drawing Sheets

(56) References Cited

U.S. PATENT DOCUMENTS

| | | | | |
|---|---|---|---|---|
| 2016/0116123 A1* | 4/2016 | Yamanaka | ............ | H01S 5/0087 362/84 |
| 2016/0377967 A1* | 12/2016 | Ando | ........................ | B32B 7/12 362/84 |
| 2017/0168379 A1 | 6/2017 | Hashizume | | |

* cited by examiner

WAVELENGTH CONVERSION ELEMENT, LIGHT SOURCE DEVICE, AND PROJECTOR

The present application is based on, and claims priority from JP Application Serial Number 2019-050086, filed Mar. 18, 2019, the disclosure of which is hereby incorporated by reference herein in its entirety.

BACKGROUND

1. Technical Field

The present disclosure relates to a wavelength conversion element, a light source device, and a projector.

2. Related Art

In the past, there has been known a wavelength conversion element which is excited by excitation light entering the wavelength conversion element to emit fluorescence having longer wavelength than the wavelength of the excitation light. As such a wavelength conversion element, there has been known a light emitting element provided with a base member, a reflecting layer formed on a surface of the base member, and a phosphor layer formed on the reflecting layer (see, e.g., JP-A-2015-197474 (Document 1)).

In the light emitting element described in Document 1, the phosphor layer has a plurality of phosphor particles and a binder for binding the plurality of phosphor particles to each other.

The binder includes a cross-linked body made of an inorganic material such as liquid glass. The binder binds a phosphor particle to another phosphor particle adjacent to each other, and at the same time, binds the phosphor particles and the surface of the reflecting layer with each other. The phosphor particles are each a phosphor shaped like a particle which absorbs the excitation light emitted from the outside to emit the fluorescence. The phosphor particles include a phosphor material such as a YAG series material. Further, in Document 1, there is shown an example in which a light source device having the light emitting element described above is applied to a projector.

In the phosphor layer described in Document 1, the plurality of phosphor particles is encapsulated in the binder. In other words, the binder exists around the phosphor particles so as to cover the entire surface of each of the phosphor particles. Therefore, the fluorescence emitted from the phosphor particles enters the inside of the binder, propagates in the binder, and is then emitted from the phosphor layer. The fluorescence emitted from the phosphor layer is emitted from the light source device, and then enters a reflective liquid crystal panel constituting an optical system.

However, when the fluorescence propagates inside the binder in the phosphor layer, an exit area of the fluorescence in the surface of the phosphor layer becomes larger than the incident area of the excitation light. Further, when the exit area of the fluorescence is large, there is a possibility that the incident efficiency of the fluorescence to the liquid crystal panel decreases in the optical system. In other words, when the entire surface of the phosphor particle is covered with the binder, there is a possibility that the use efficiency of the fluorescence in the optical system which the fluorescence enters from the phosphor layer decreases.

In contrast, in the wavelength conversion element, there can occur a phenomenon called backward scattering (backscatter) that a part of the excitation light with which the phosphor layer has been irradiated returns without being converted into the fluorescence by the phosphor particles. There is a problem that the wavelength conversion efficiency of the excitation light decreases when the intensity of such excitation light increases.

SUMMARY

A wavelength conversion element according to a first aspect of the present disclosure includes a phosphor layer having a plurality of phosphor particles and a binder configured to bind one of the phosphor particles adjacent to each other and another of the phosphor particles adjacent to each other out of the plurality of phosphor particles, an antireflection layer disposed on an incident side of the excitation light with respect to the phosphor layer, and a substrate provided with the phosphor layer, wherein the binder includes glass, and the binder binds a part of a surface of the one of the phosphor particles and a part of a surface of the another of the phosphor particles to each other.

A wavelength conversion element according to a second aspect of the present disclosure includes a phosphor layer having a plurality of phosphor particles, a binder configured to bind one of the phosphor particles adjacent to each other and another of the phosphor particles adjacent to each other out of the plurality of phosphor particles, and an antireflection layer disposed on a surface of the phosphor particle, and a substrate provided with the phosphor layer, wherein the binder includes glass, and the binder binds at least any one of a part of a surface of the one of the phosphor particles and a part of a surface of the another of the phosphor particles, the antireflection layer disposed on the surface of the one of the phosphor particles and the antireflection layer disposed on the surface of the another of the phosphor particles, and a part of the surface of the one of the phosphor particles and the antireflection layer disposed on a part of the surface of the another of the phosphor particles.

In the first and second aspects described above, a proportion of a volume of the binder to a total volume of a sum of volumes of the phosphor particles and a sum of volumes of the binder may be larger than 0 vol % and no larger than 10 vol %.

A light source device according to a third aspect of the present disclosure includes any one of the wavelength conversion elements described above, and a light source configured to emit excitation light to the wavelength conversion element.

A projector according to a fourth aspect of the present disclosure includes the light source device described above, a light modulation device configured to modulate light emitted from the light source device in accordance with image information, and a projection optical device configured to project the light modulated by the light modulation device.

DESCRIPTION OF EXEMPLARY EMBODIMENTS

First Embodiment

Figure 1:
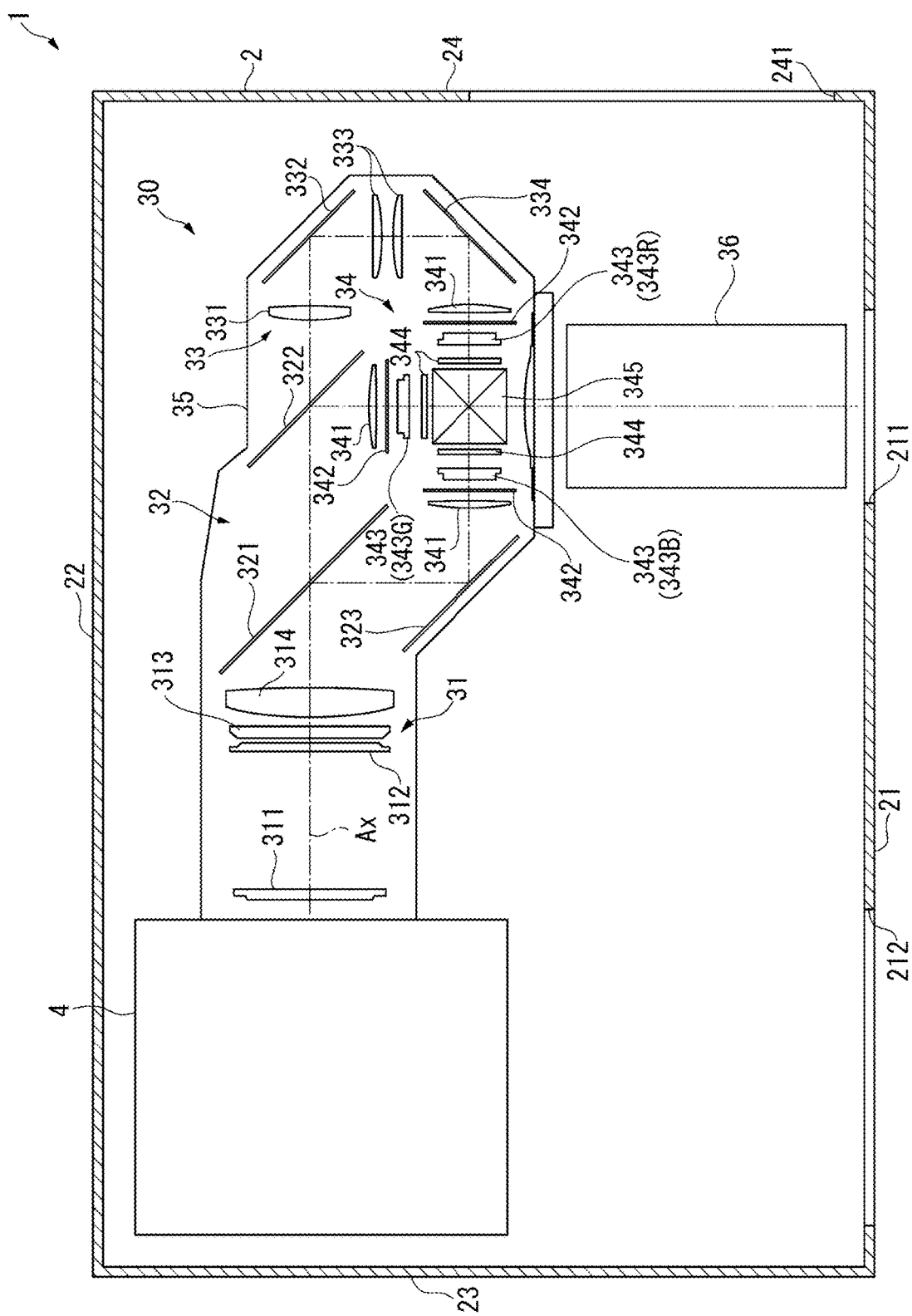
FIG. 1 is a schematic diagram showing a configuration of the projector according to the first embodiment.

A first embodiment of the present disclosure will hereinafter be described based on the drawings.
Schematic Configuration of Projector FIG. 1 is a schematic diagram showing a configuration of a projector 1 according to the present embodiment.

The projector 1 according to the present embodiment modulates the light emitted from a light source device 4 described later to project image light for forming an image corresponding to image information on a projection target surface such as a screen in an enlarged manner. As shown in FIG. 1, the projector 1 is provided with an exterior housing 2 forming an exterior, and the light source device 4 and an optical device 30 disposed inside the exterior housing 2. It should be noted that a configuration of the light source device 4 and the optical device 30 will be described later in detail. Besides the above, although not shown in the drawing, the projector 1 is provided with a control device for controlling an operation of the projector 1, a power supply device for supplying electronic components with electrical power, and a cooling device for cooling a cooling target.
Configuration of Exterior Housing The exterior housing 2 has a top surface part and a bottom surface part each not shown, a front surface part 21, a back surface part 22, a left side surface part 23, and a right side surface part 24, and is formed to have a substantially rectangular solid shape.

The front surface part 21 has an opening part 211 for exposing a part of a projection optical device 36 described later, and the image light to be projected by the projection optical device 36 passes through the opening part 211. Further, the front surface part 21 has an exhaust port 212 from which a cooling gas having cooled the cooling target in the projector 1 is discharged to the outside of the exterior housing 2. Further, the right side surface part 24 has an introduction port 241 from which a gas located outside the exterior housing 2 is introduced inside as the cooling gas.
Configuration of Optical Device The optical device 30 is provided with a homogenizing device 31, a color separation device 32, a relay device 33, an image forming device 34, an optical component housing 35, and the projection optical device 36.

The homogenizing device 31 homogenizes the light emitted from the light source device 4. The light thus homogenized by the homogenizing device 31 illuminates modulation areas of light modulation devices 343 described later of the image forming device 34 via the color separation device 32 and the relay device 33. The homogenizing device 31 is provided with two lens arrays 311, 312, a polarization conversion element 313, and a superimposing lens 314.

The color separation device 32 separates the light having entered the color separation device 32 from the homogenizing device 31 into colored light beams of red, green, and blue. The color separation device 32 is provided with two dichroic mirrors 321, 322 and a reflecting mirror 323 for reflecting the blue light beam having been separated by the dichroic mirror 321.

The relay device 33 is disposed on a light path of the red light beam longer than a light path of the blue light beam and a light path of the green light beam to suppress a loss of the red light beam. The relay device 33 is provided with an incident side lens 331, relay lenses 333, and reflecting mirrors 332, 334.

It should be noted that although the relay device 33 is disposed in the light path of the red light beam, this is not a limitation, and it is also possible to adopt a configuration in which, for example, the colored light beam longer in light path than other colored light beams is set to the blue light beam, and the relay device 33 is disposed on the light path of the blue light beam.

The image forming device 34 modulates each of the colored light beams of red, green, and blue having entered the image forming device 34, and combines the colored light beams thus modulated with each other to form the image light to be projected by the projection optical device 36. The image forming device 34 is provided with three field lenses 341, three incident side polarization plates 342, three light modulation devices 343, and three exit side polarization plates 344 each disposed in accordance with the respective colored light beams entering the image forming device 34, and a single color combining device 345.

The light modulation devices 343 each modulate the light emitted from the light source device 4 in accordance with the image information. The light modulation devices 343 include the light modulation device 343R for modulating the red light beam, the light modulation device 343G for modulating the green light beam, and the light modulation device 343B for modulating the blue light beam. In the present embodiment, the light modulation devices 343 are each formed of a transmissive liquid crystal panel, and the incident side polarization plate 342, the light modulation device 343, and the exit side polarization plate 344 constitute a liquid crystal light valve.

The color combining device 345 combines the colored light beams respectively modulated by the light modulation devices 343B, 343G, and 343R with each other to form the image light described above. In the present embodiment, the color combining device 345 is formed of a cross dichroic prism, but this is not a limitation, and it is also possible for the color combining device 346 to be constituted by, for example, a plurality of dichroic mirrors.

The optical component housing 35 houses the homogenizing device 31, the color separation device 32, the relay device 33, and the image forming device 34 each described above inside. It should be noted that an illumination light axis Ax as a design optical axis is set in the optical device 30, and the optical component housing 35 holds the homogenizing device 31, the color separation device 32, the relay device 33, and the image forming device 34 at predetermined positions on the illumination light axis Ax. The light source device 4 and the projection optical device 36 are disposed at predetermined positions on the illumination light axis Ax.

The projection optical device 36 projects the image light entering the projection optical device 36 from the image forming device 34 on the projection target surface in an enlarged manner. In other words, the projection optical device 36 projects the light beams having respectively been modulated by the light modulation devices 343B, 343G, and 343R. The projection optical device 36 is configured as a combination lens having, for example, a plurality of lenses housed in a lens tube having a cylindrical shape.

Configuration of Light Source Device

Figure 2:
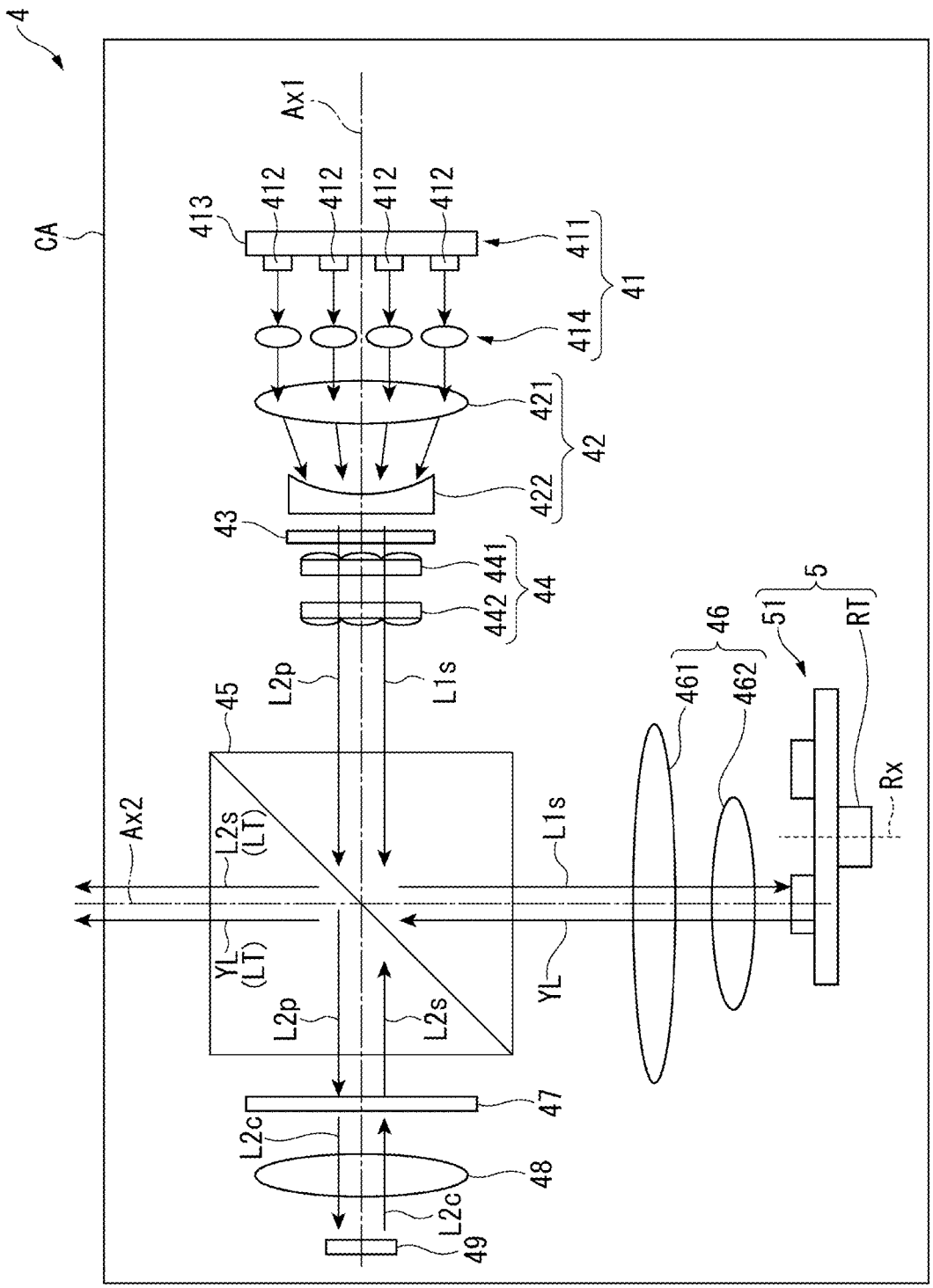
FIG. 2 is a schematic diagram showing a configuration of a light source device in the first embodiment.

FIG. 2 is a schematic diagram showing a configuration of the light source device 4.

The light source device 4 emits illumination light LT for illuminating the light modulation devices 343 to the homogenizing device 31. As shown in FIG. 2, the light source device 4 is provided with a light source housing CA, and a light source section 41, an afocal optical element 42, a first retardation element 43, a homogenizer optical element 44, a polarization split element 45, a first light collection element 46, a second retardation element 47, a second light collection element 48, a diffusely reflecting device 49, and a wavelength conversion device 5 each housed in the light source housing CA.

The light source housing CA is a sealed housing difficult for dust or the like to enter the inside thereof.

The light source section 41, the afocal optical element 42, the first retardation element 43, the homogenizer optical element 44, the polarization split element 45, the second retardation element 47, the second light collection element 48, and the diffusely reflecting device 49 are arranged on an illumination light axis Ax1 set in the light source device 4.

The wavelength conversion device 5, the first light collection element 46, and the polarization split element 45 are arranged on an illumination light axis Ax2 which is set in the light source device 4, and is perpendicular to the illumination light axis Ax1. The illumination light axis Ax2 coincides with the illumination light axis Ax at the position of the lens array 311. In other words, the illumination light axis Ax2 is set on an extended line of the illumination light axis Ax.

Configuration of Light Source Section

The light source section 41 is provided with a light source 411 for emitting the light, and collimator lenses 414.

The light source 411 is provided with a plurality of solid-state light sources 412 as the light emitting elements, and a support member 413.

The solid-state light sources 412 are each a semiconductor laser for emitting blue light L1s, which is s-polarized light as excitation light. The blue light L1s is, for example, a laser beam with a peak wavelength of 440 nm.

The support member 413 supports the plurality of solid-state light sources 412 arranged in an array on a plane perpendicular to the illumination light axis Ax1. The support member 413 is a metallic member having thermal conductivity.

The blue light L1s having been emitted from the solid-state light source 412 is collimated into a parallel light beam by the collimator lens 414, and the parallel light beam enters the afocal optical element 42.

It should be noted that in the present embodiment, the light source 411 has a configuration of emitting the blue light L1s which is s-polarized light as linearly polarized light beams the same in polarization direction. However, this is not a limitation, and the light source 411 can also be provided with a configuration of emitting blue light which is linearly polarized light beams different in polarization direction. In this case, the first retardation element 43 can be omitted.

Configuration of Afocal Optical Element

The afocal optical element 42 adjusts the beam diameter of the blue light L1s which enter the afocal optical element 42 from the light source section 41, and then makes the blue light L1s enter the first retardation element 43. The afocal optical element 42 is constituted by a lens 421 for collecting the incident light, and a lens 422 for collimating the light beam collected by the lens 421.

Configuration of First Retardation Element

The first retardation element 43 is disposed on the light path between the afocal optical element 42 and the homogenizer optical element 44, more specifically, between the lens 422 and a multi-lens array 441 constituting the homogenizer optical element 44. The first retardation element 43 is disposed so as to be able to rotate along a surface which the blue light L1s enters, namely a plane perpendicular to the illumination light axis Ax1. The first retardation element 43 is formed of a ½ wave plate with respect to the wavelength 446 nm of the blue light L1s. The optical axis of the first retardation element 43 crosses the polarizing axis of the blue light L1s entering the first retardation element 43. It should be noted that the optical axis of the first retardation element 43 can be either of a fast axis and a slow axis of the first retardation element 43.

The blue light L1s is coherent s-polarized light. Although the blue light L1s is originally the s-polarized light, the polarization axis of the blue light L1s crosses the optical axis of the first retardation element 43. Therefore, when the blue light L1s is transmitted through the first retardation element 43, the s-polarized light is partially converted into p-polarized light. Therefore, the blue light having been transmitted through the first retardation element 43 becomes light including the blue light L1s as the original s-polarized light and blue light L2p as the p-polarized light are mixed in a predetermined proportion.

It should be noted that it is also possible for the light source device 4 to be provided with a motor for rotating the first retardation element 43.

Configuration of Homogenizer Optical Element

The homogenizer optical element 44 homogenizes the illuminance distribution of the blue light L1s, L2p. The homogenizer optical element 44 is formed of a pair of multi-lens arrays 441, 442.

Configuration of Polarization Split Element

The blue light L1s, L2p having passed through the homogenizer optical element 44 enters the polarization split element 45.

The polarization split element 45 is a prism-type polarization beam splitter, and separates an s-polarization component and a p-polarization component included in the incident light from each other. Specifically, the polarization split element 45 reflects the s-polarization component, and transmits the p-polarization component. Further, the polarization split element 45 has a color separation characteristic of transmitting light with the wavelength no shorter than a predetermined wavelength irrespective of whether the polarization component is the s-polarization component or the p-polarization component. Therefore, the blue light L1s as the s-polarized light is reflected by the polarization split element 45, and then enters the first light collection element 46. Meanwhile, the blue light L2p as the p-polarized light is transmitted through the polarization split element 45, and then enters the second retardation element 47.

Configuration of First Light Collection Element

The first light collection element 46 converges the blue light L1s having been reflected by the polarization split element 45 on the wavelength conversion device 5. Further, the first light collection element 46 collimates fluorescence YL entering the first light collection element 46 from the wavelength conversion device 5. Although the first light collection element 46 is constituted by two lenses 461, 462 in the example shown in FIG. 2, the number of the lenses constituting the first light collection element 46 does not matter.

Configuration of Wavelength Conversion Device

The wavelength conversion device 5 is excited by the light entering the wavelength conversion device 5, and emits light having a wavelength different from the wavelength of the light having entered the wavelength conversion device 5 to the first light collection element 46. In other words, the wavelength conversion device 5 converts the wavelength of the incident light.

In the present embodiment, the wavelength conversion device 5 is provided with a wavelength conversion element 51 for emitting the fluorescence YL having the wavelength longer than the wavelength of the blue light L1s in response to incidence of the blue light L1s as the excitation light, and a rotary section RT for rotating the wavelength conversion element 51 around a rotational axis Rx parallel to the illumination light axis Ax2 as a predetermined rotational axis. It should be noted that the rotational axis Rx of the wavelength conversion element 51 is a rotational axis along the incident direction of the blue light L1s as the excitation light.

Among these, the wavelength conversion element 51 is a reflective wavelength conversion element for emitting the fluorescence YL toward the incident side of the blue light L1s. It should be noted that the fluorescence YL is, for example, light having a peak wavelength in a range of 500 nm through 700 nm. In other words, the fluorescence YL includes a green light component and a red light component.

The configuration of such a wavelength conversion element 51 will be described later in detail.

The fluorescence YL having been emitted from the wavelength conversion device 5 passes through the first light collection element 46 along the illumination light axis Ax2, and then enters the polarization split element 45. Then, the fluorescence YL passes through the polarization split element 45 along the illumination light axis Ax2.

Configuration of Second Retardation Element

The second retardation element 47 is disposed between the polarization split element 45 and the second light collection element 48. The second retardation element 47 is a ¼ wave plate, and the blue light L2p as the p-polarized light having passed through the polarization split element 45 is converted by the second retardation element 47 into blue light L2c as circularly polarized light, and then enters the second light collection element 48.

Configuration of Second Light Collection Element

The second light collection element 48 converges the blue light L2c entering the second light collection element 48 from the first retardation element 47 on the diffusely reflecting device 49. Further, the second light collection element 48 collimates the blue light L2c entering the second light collection element 48 from the diffusely reflecting device 49. It should be noted that the number of lenses constituting the second light collection element 48 can arbitrarily be changed.

Configuration of Diffusely Reflecting Device

The diffusely reflecting device 49 diffusely reflects the blue light L2c having entered the diffusely reflecting device 49 from the second light collection element 48 toward the polarization split element 45 at substantially the same diffusion angle as that of the fluorescence YL emitted from the wavelength conversion device 5. As a configuration of the diffusely reflecting device 49, there can be illustrated a configuration provided with a reflecting plate for performing Lambertian reflection on the blue light L2c having entered the reflecting plate, and a rotation device for rotating the reflecting plate around a rotational axis parallel to the illumination light axis Ax1. In the light source device 4, by diffusely reflecting the blue light L2c using this kind of diffusely reflecting device 49, it is possible to obtain blue light having a substantially uniform illuminance distribution.

As shown in FIG. 2, the blue light L2c having diffusely been reflected by the diffusely reflecting device 49 passes through the second light collection element 48, and then enters the second retardation element 47 once again. The blue light L2c is converted into circularly polarized light with the opposite rotational direction when reflected by the diffusely reflecting device 49. Therefore, the blue light L2c entering the second retardation element 47 from the second light collection element 48 is converted by the second retardation element 47 not into the blue light L2p as the p-polarized light which enters the second retardation element 47 from the polarization split element 45, but into the blue light L2s as the s-polarized light. Then, the blue light L2s as the s-polarized light is reflected by the polarization split element 45, and then enters the homogenizing device 31 described above along the illumination light axis Ax2 together with the fluorescence YL.

Configuration of Wavelength Conversion Element

Figure 3:
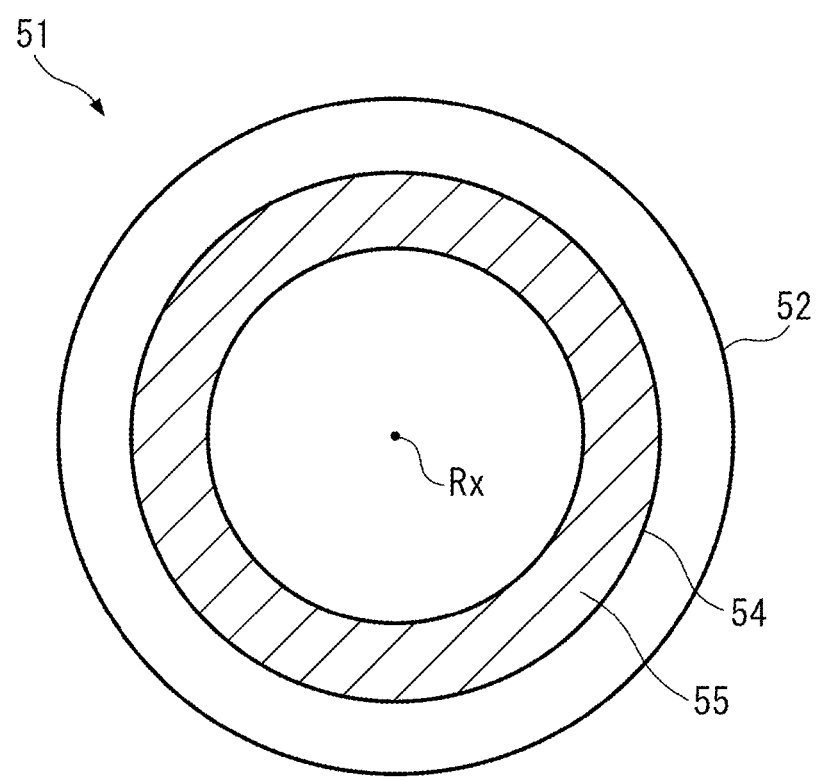
FIG. 3 is a plan view of a wavelength conversion element in the first embodiment viewed from an incident side of excitation light.
Figure 4:
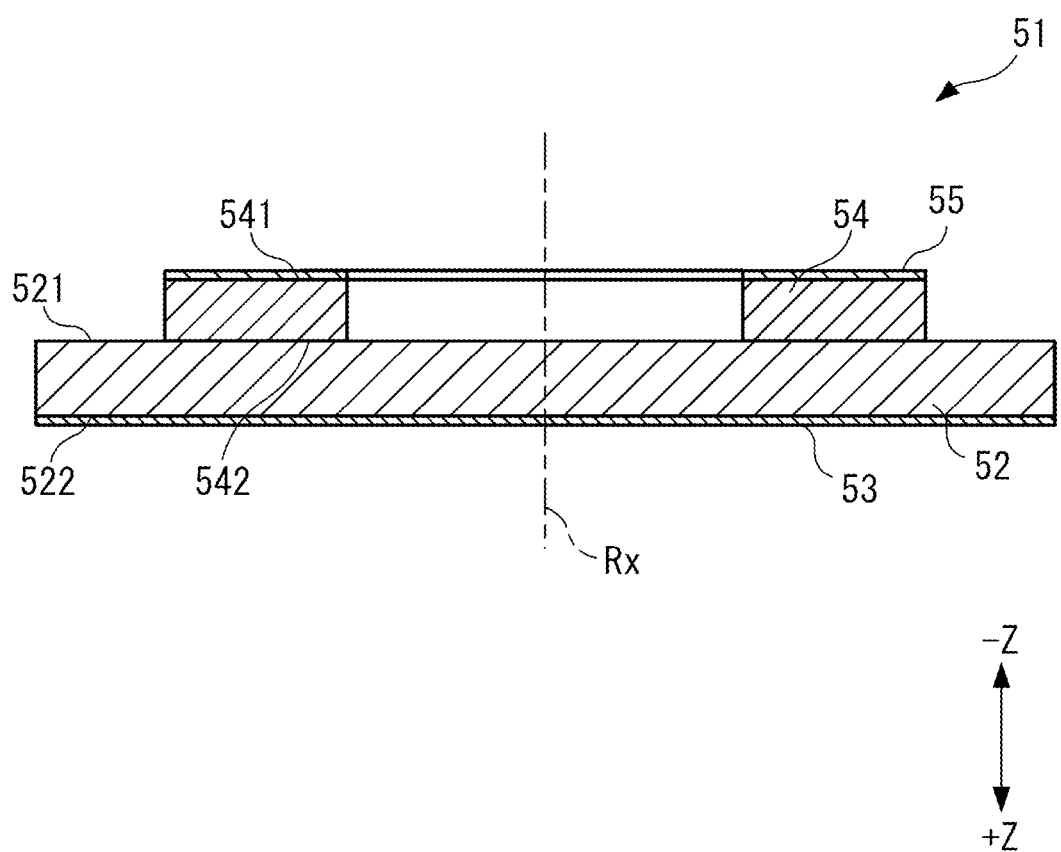
FIG. 4 is a schematic diagram showing a cross-sectional surface of the wavelength conversion element in the first embodiment.

FIG. 3 is a plan view of the wavelength conversion element 51 viewed from the incident side of the excitation light. FIG. 4 is a diagram schematically showing a cross-sectional surface of the wavelength conversion element 51.

The wavelength conversion element 51 is a reflective wavelength conversion element for emitting the fluorescence as the light having a different wavelength from the wavelength of the excitation light toward the incident side of the excitation light. As shown in FIG. 3 and FIG. 4, the wavelength conversion element 51 has a substrate 52, a radiator sheet 53, a phosphor layer 54, and an antireflection layer 55. It should be noted that the wavelength conversion element 51 is manufactured using a manufacturing method described later.

It should be noted that in the following description and the drawings, the blue light L1s entering the wavelength conversion element 51 is described as excitation light for exciting the phosphor particles included in the wavelength conversion element 51. Further, the incident direction of the excitation light to the wavelength conversion element 51 is defined as a +Z direction, and an opposite direction to the +Z direction is defined as a −Z direction.

Configuration of Substrate

The substrate 52 is a holding member for holding the radiator sheet 53, the phosphor layer 54, and the antireflection layer 55, and in addition, the substrate 52 is also a radiator member for radiating the heat transferred from the phosphor layer 54. As shown in FIG. 3, the substrate 52 is formed of, for example, a metal material including at least either of alumina and zinc oxide so as to have a disk-like shape when viewed from the −Z direction. The substrate 52 is rotated together with the radiator sheet 53, the phosphor layer 54, and the antireflection layer 55 around the rotational axis Rx by the rotary section RT.

As shown in FIG. 4, the substrate 52 has a first surface 521 as a surface on the −Z direction side, and a second surface 522 as a surface on the +Z direction side.

The first surface 521 is an opposed surface opposed to the phosphor layer 54.

The second surface 522 is a surface on the opposite side to the first surface 521. To the second surface 522, there is bonded the radiator sheet 53, the heat generated in the phosphor layer 54 is transferred to the radiator sheet 53 via the substrate 52, and heat having been transferred is transferred to the entire area of the radiator sheet 53. The radiator sheet 53 increases the contact area with the ambient gas to thereby enhance the radiation efficiency of the heat having been transferred to the substrate 52. The radiator sheet 53 is formed of, for example, aluminum or graphite.

The substrate 52 is a sintered body obtained by calcining alumina powder having a submicron size at low temperature to include microscopic gas pockets as much as about 20% in volume, and reflects the light entering the substrate 52 from the phosphor layer 54 toward the phosphor layer 54 side.

Configuration of Phosphor Layer

The phosphor layer 54 is disposed on the −Z direction side as the incident side of the excitation light with respect to the substrate 52. The phosphor layer 54 converts the excitation light entering the phosphor layer 54 into fluorescence, and then emits the fluorescence. In other words, the phosphor layer 54 performs the wavelength conversion on the excitation light entering the phosphor layer 54 to generate and then emit the fluorescence as the light having a longer wavelength than the wavelength of the excitation light. As shown in FIG. 3, the phosphor layer 54 is formed to have an annular shape centered on the rotational axis Rx of the wavelength conversion element 51 when viewed from the −Z direction.

As shown in FIG. 4, the phosphor layer 54 has a first surface 541 as a surface on the −Z direction side, and a second surface 542 as a surface on the +Z direction side, and a surface on an opposite side to the first surface 541.

The first surface 541 is a plane of incidence which the excitation light enters, and is an exit surface from which the fluorescence is emitted. The second surface 542 is an opposed surface opposed to the substrate 52.

Figure 5:
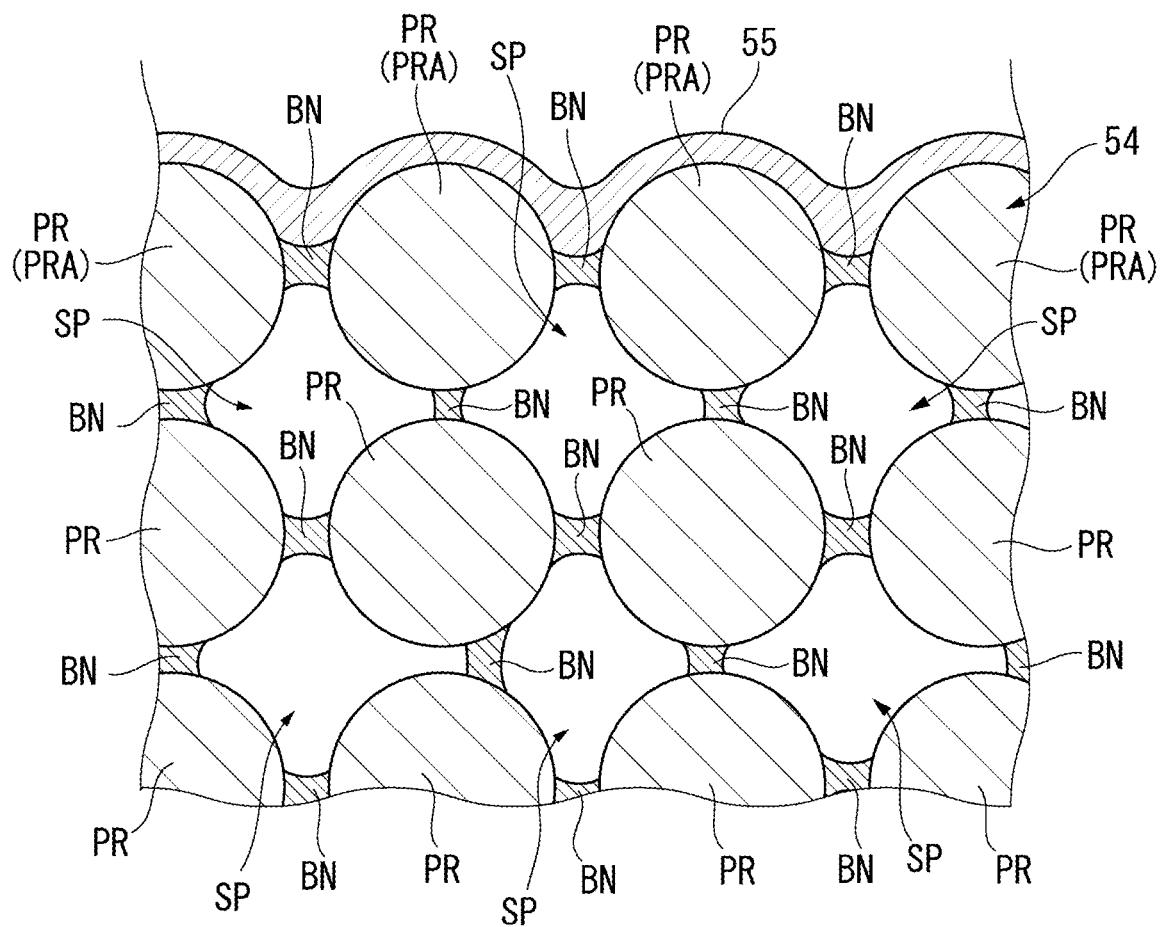
FIG. 5 is a schematic diagram showing a part of a phosphor layer and an antireflection layer in the first embodiment in an enlarged manner.

FIG. 5 is a schematic diagram showing a part of the phosphor layer 54 and a part of the antireflection layer 55 in an enlarged manner. In other words, FIG. 5 is a cross-sectional view schematically showing a plurality of phosphor particles PR and a binder BN constituting the phosphor layer 54 and the antireflection layer 55.

As shown in FIG. 5, the phosphor layer 54 includes the plurality of phosphor particles PR and the binder BN including glass, and has a configuration in which the phosphor particles PR are bound to each other with the binder BN. Specifically, the two phosphor particles PR adjacent to each other are bound to each other by the binder BN to be bonded to a part of the surface of each of the phosphor particles PR.

The phosphor particles PR are each a particle including a phosphor material and an activator agent to be the light emission center. As the activator agent, there can be cited, for example, Ce, Eu, Pr, Cr, Gd, and Ga. As the phosphor material, there can be adopted a YAG phosphor material. However, this is not a limitation, and as the phosphor material, it is possible to adopt a phosphor material obtained by displacing Y in the YAG phosphor with Lu, Gd, or GA, or it is also possible to adopt a KSF phosphor material, an SCASN phosphor material, or the like instead of the YAG phosphor material. Further, the phosphor material can also be a mixture of a plurality of phosphor materials.

The binder BN is bonded to a part of the surface of each of the phosphor particles PR adjacent to each other out of the plurality of phosphor particles PR to bind the phosphor particles PR adjacent to each other. As the binder BN, there is used borosilicate glass in the present embodiment, but phosphate glass can also be used.

It should be noted that microscopic voids SP are disposed inside the phosphor layer 54. Since such voids SP are included, spread of the fluorescence inside the phosphor layer 54 is suppressed, and by taking out the fluorescence from the phosphor layer 54 in a small range, the light collection efficiency of the optical system can be enhanced.

As shown in FIG. 4, the antireflection layer 55 is disposed on at least the first surface 541 as the plane of incidence which the excitation light enters in the phosphor layer 54, and is formed of a single layer or a multilayered dielectric film. In other words, the antireflection layer 55 is disposed on the incident side of the excitation light with respect to the phosphor layer 54. The antireflection layer 55 prevents the excitation light entering the wavelength conversion element 51 from being reflected by the first surface 541 to thereby make the excitation light easy to enter the phosphor layer 54.

Such an antireflection layer 55 is formed on the phosphor layer 54 using vapor deposition or the like. Therefore, as shown in FIG. 5, the antireflection layer 55 is formed so as to cover the plurality of phosphor particles PRA located on the −Z direction side in the phosphor layer 54 to form the first surface 541 out of the plurality of phosphor particles PR, and the binder BN for binding the plurality of phosphor particles PRA on the −Z direction side.

In the present embodiment, the antireflection layer 55 is formed only on the first surface 541 of the phosphor layer 54. However, this is not a limitation, and the antireflection layer 55 can also be formed on at least either of, for example, an inner peripheral surface and an outer peripheral surface of the phosphor layer 54 in addition to the first surface 541.

Figure 6:
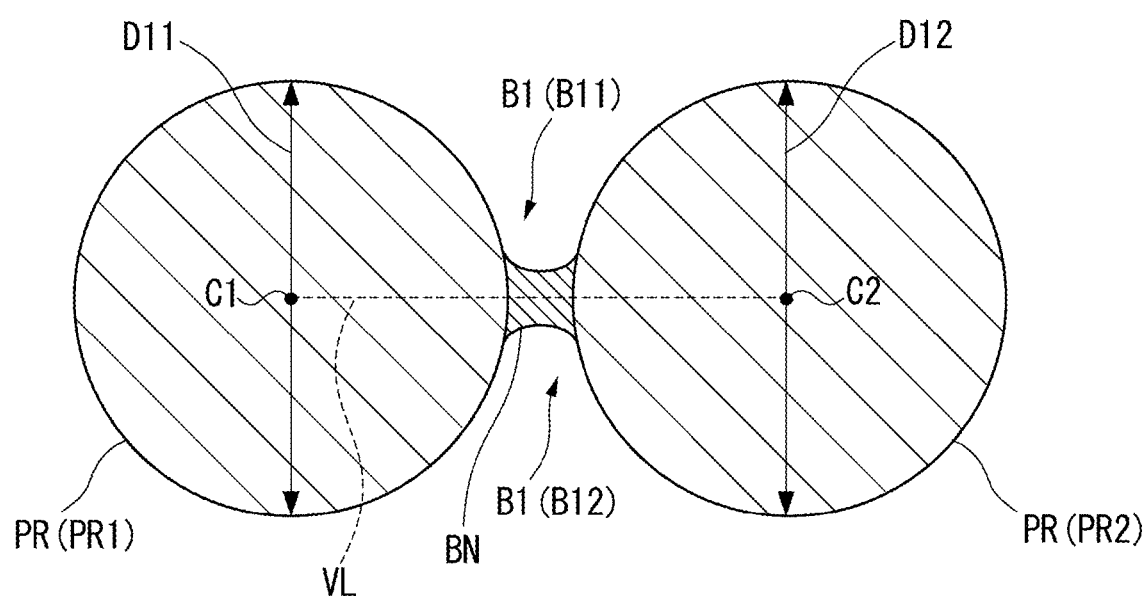
FIG. 6 is a schematic diagram showing a binding state of phosphor particles with a binder in the first embodiment.

Relationship Between Area of Binding Part in Phosphor Particle and Brightness in Optical System FIG. 6 is a schematic diagram showing a binding state of the phosphor particles PR with the binder BN. In other words, FIG. 6 is a schematic diagram showing the state in which the phosphor particles PR (PR1, PR2) adjacent to each other are bound to each other with the binder BN.

As shown in FIG. 6, defining the region to which the binder BN is bonded in the phosphor particle PR as a binding part B1, in the present embodiment, the area of the binding part B1 is set to a value no higher than 10% of the surface area of the phosphor particle PR in order to increase the luminance of the light transmitted through the optical device 30 as the optical system which the illumination light including the fluorescence emitted from the phosphor layer 54 enters. In the detailed description, the area of the binding part B1 is set to a value within a range no lower than 3% and no higher than 5% of the surface area of the phosphor particle PR. This derives from the following experimental result.

Figure 7:
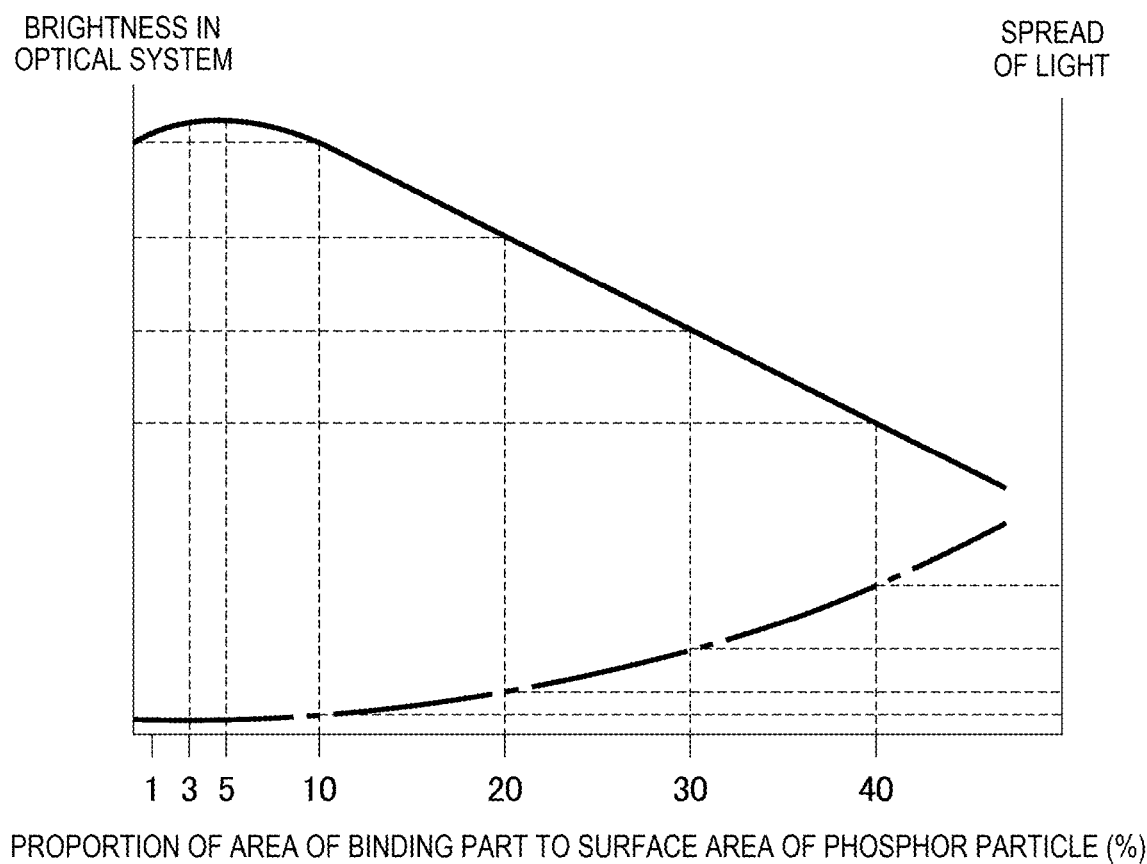
FIG. 7 is a graph showing brightness and spread of light in an optical system with respect to the area of the binding part in the first embodiment.

FIG. 7 is a graph showing the brightness in the optical system in the optical device 30 and the spread of the light with respect to the proportion of the area of the binding part B1 to the surface area of the phosphor particle PR.

The inventors conducted an experiment of measuring the spread of the light emitted from the phosphor layer 54 and the brightness in the optical system in the optical device 30 while changing the proportion of the area of the binding part B1 to the surface area of the phosphor particle PR. It should be noted that the brightness in the optical system mentioned here represents the intensity of the light which can be converged on the light modulation devices 343. Further, the spread of the light is a proportion of the area of the exit region of the fluorescence to the area of the incident region of the excitation light in the first surface 541 of the phosphor layer 54. In the following description, the proportion of the area of the binding part B1 to the surface area of the phosphor particle PR is abbreviated as an area proportion.

The higher the area proportion was, the broader the spread of the light emitted from the phosphor layer 54 became as represented by the dashed-dotted line in FIG. 7. In other words, the larger the area of the binding part B1 was, the broader the spread of the light emitted from the phosphor layer 54 became.

As represented by the solid line in FIG. 7, it was found out that it was not true that the lower the area proportion was the higher the brightness in the optical system became, but there existed the maximum value (the highest value) in the brightness in the optical system.

In the detailed description, in the range in which the area proportion was no higher than 10%, the brightness in the optical system increased and then decreased as the area proportion increased. Further, it was found out that the maximum value of the brightness in the optical system appeared when the area proportion was in the range of no lower than 3% and no higher than 5%.

In contrast, in a range in which the area proportion exceeded 10%, the brightness in the optical system was lower than the value when the area proportion was 0%, and the higher the area proportion was, the lower the brightness in the optical system became.

In other words, it was found out that the brightness in the optical system became higher when the area proportion was no higher than 10% than the value when the area proportion was 0%, and took the maximum value when the area proportion was in the range of no lower than 3% and no higher than 5%.

It is conceivable that the reason that there exists the range of the area proportion in which the brightness in the optical system takes the high value as described above is as follows.

The refractive index of the phosphor particles PR is about 1.8. In contrast, the refractive index of the borosilicate glass constituting the binder BN is about 1.5.

Therefore, the fluorescence having been generated inside the phosphor particle PR and then entered the binding part B1 propagates the binder BN from the binding part B1 to proceed to the inside of the adjacent phosphor particles PR.

In contrast, since the voids SP are disposed inside the phosphor layer 54, other areas than the binding part B1 have contact with air on the outside surface of each of the phosphor particles PR. Therefore, in accordance with the Fresnel formula, the fluorescence which is generated inside the phosphor particle PR and then enters the other areas than the binding part B1 in the outside surface of the phosphor particle PR is mostly emitted outside the phosphor particle PR and partially reflected inside the phosphor particle PR, or is totally reflected inside the phosphor particle PR.

When the area proportion is high, the amount of fluorescence entering the binding part B1 increases. In other words, when the area proportion is high, the amount of fluorescence propagating the binder BN via the binding part B1 increases. In this case, since a difference between the refractive index of the phosphor particles PR and the refractive index of the binder BN is small, and the refraction on the interface between the phosphor particle PR and the binder BN is small, the fluorescence becomes apt to spread to the neighboring phosphor particles PR. Therefore, the fluorescence goes out from the first surface 541 of the phosphor layer 54 to the outside as a light source broad in spread. Thus, the fluorescence having been emitted from the phosphor layer 54 becomes difficult to be converged on the light modulation devices 343 of the optical device 30 as the optical system. In other words, in this case, the brightness in the optical system lowers.

When the area proportion is low, the fluorescence generated inside the phosphor particle PR becomes easy to enter the other areas than the binding part B1 on the outside surface of the phosphor particle PR, namely the interface with the air. Therefore, since the intensity of the fluorescence refracted on the interface between the phosphor particle PR and the air, and emitted from the phosphor particle PR, and the intensity of the fluorescence totally reflected increase, the fluorescence is prevented from spreading to the phosphor particles PR in a neighboring broad range, and the fluorescence goes out as the light source small in spread to the outside from the first surface 541 of the phosphor layer 54. Such fluorescence is apt to converge on the light modulation devices 343. In other words, in this case, the brightness in the optical system rises.

In contrast, when the area proportion has such an extremely small value as, for example, a value no higher than 1%, the fluorescence becomes apt to be confined inside the phosphor particle PR. In this case, the reflection of the fluorescence on the interface with the voids SP becomes apt to be repeated, and thus, the light path length of the fluorescence increases. As described above, by the fluorescence passing through the phosphor particle PR many times, self-absorption becomes apt to occur. The self-absorption is a phenomenon that the phosphor absorbs the fluorescence to generate heat since the emission wavelength of the phosphor partially overlaps the absorption wavelength of the phosphor. When such self-absorption occurs, the intensity of the fluorescence emitted from the phosphor layer 54 decreases, and by extension, the brightness in the optical system decreases.

On the other hand, when the frequency of the reflection and the refraction on the interface with the air in the phosphor particle PR increases, the excitation light with which the phosphor particles PR are irradiated from the outside of the phosphor layer 54 becomes apt to be reflected by the surface of each of the phosphor particles PR, or the inside of each of the phosphor particles PR. The intensity of the excitation light which is radiated outside the phosphor layer 54 without being converted into the fluorescence increases. In other words, backward scattering (backscatter) of the excitation light becomes apt to occur. In this case, by the intensity of the excitation light to be converted into the fluorescence decreasing, the intensity of the fluorescence emitted from the phosphor layer 54 decreases, and by extension, the brightness in the optical system can decrease.

According to such a consideration, it has been understood that in order to increase the brightness in the optical system, the area proportion preferably has a value no higher than 10%, and more preferably has a value no lower than 3% and no higher than 5%.

Size of Binding Part to Binder in Phosphor Particle

In the present embodiment, in order to make the proportion of the area of the binding part B1 to the surface area of the phosphor particle PR no higher than 10%, the phosphor layer 54 is manufactured so that the size of the binding part B1 becomes the following size. It should be noted that in the following description, the phosphor particles bound to each other with the binder BN and adjacent to each other out of the plurality of phosphor particles PR are defined as the phosphor particles PR1, PR2 as shown in FIG. 6. Further, the binding part B1 with the binder BN in the phosphor particle PR1 is defined as the binding part B11, and the binding part B1 with the binder BN in the phosphor particle PR2 is defined as the binding part B12. Further, the two axes which are perpendicular to an imaginary line VL connecting the centers C1, C2 of the respective phosphor particles PR1, PR2, and are perpendicular to each other are defined as an X axis and a Y axis.

In the present embodiment, the dimension in the Y axis of the binding part B11 is made no larger than ¼ of the diameter D11 of the phosphor particle PR1, and although not shown in the drawing, the dimension in the X axis of the binding part B11 is made no larger than ¼ of the diameter D11 of the phosphor particle PR1. In other words, the dimension in the Y axis of the binding part B11 is made no larger than ¼ of the size in the Y axis of the phosphor particle PR1, and although not shown in the drawing, the dimension in the X axis of the binding part B11 is made no larger than ¼ of the size in the X axis of the phosphor particle PR1.

Similarly, the dimension in the Y axis of the binding part B12 is made no larger than ¼ of the diameter D12 of the phosphor particle PR2, and although not shown in the drawing, the dimension in the X axis of the binding part B12 is made no larger than ¼ of the diameter D12 of the phosphor particle PR2. In other words, the dimension in the Y axis of the binding part B12 is made no larger than ¼ of the size in the Y axis of the phosphor particle PR2, and although not shown in the drawing, the dimension in the X axis of the binding part B12 is made no larger than ¼ of the size in the X axis of the phosphor particle PR2.

Further, the thickness of the binder BN, namely the dimension of the binder BN along the imaginary line VL is made no larger than $1/10$ of the diameter of the phosphor particle PR.

As described above, since the dimension of the binding part B1 is the size described above, the proportion described above becomes the value no higher than 10%, and it is possible to increase the brightness in the optical system.

Calculational Size of Binding Part

The area proportion described above for increasing the brightness in the optical system is also supported by a calculation result based on the diameter of the phosphor particle PR.

When the phosphor particles PR included in the phosphor layer 54 are each assumed to have a spherical shape, the surface area of the phosphor particle PR with a radius of R is $4\pi \cdot R^2$.

In contrast, when the phosphor particles PR each having a spherical shape and uniformed in particle diameter are densely arranged, the filling rate of the phosphor particles PR per unit volume is typically 60 through 75%. In this case, the number of other phosphor particles PR having contact with one phosphor particle PR is 8 through 12.

When the number of the other phosphor particles PR having contact with the one phosphor particle PR is assumed as 8, and the binder BN is assumed as a circular cylinder having a thickness of t and a radius of r, the total area of the binding part B1 is $8\pi \cdot r^2$. It should be noted that the thickness of the binder BN is a dimension along the imaginary line VL shown in FIG. 6.

According to the above, the area proportion described above is obtained as $8\pi \cdot r^2/(4\pi \cdot R^2)$. In other words, the area proportion described above becomes $2r^2/R^2$.

When assuming the radius R of the phosphor particle PR as 12 μm, and assuming the proportion of the binding part B1 to the surface area of the phosphor particle PR as 5% (=0.05) based on the experimental result described above, the radius r of the binding part B1 becomes about 1.89 μm. In other words, the radius r of the binding part B1 when using a circle as the shape of the binding part B1 in the phosphor particle PR becomes about 2 μm, and the diameter of the binding part B1 becomes about 4 μm. Further, assuming the number of the other phosphor particles PR having contact with the one phosphor particle PR as 12, the radius r of the binding part B1 becomes about 3 μm, and the diameter of the binding part B1 becomes about 6 μm. Therefore, the radius r of the binding part B1 is about 2 through 3 μm, and the diameter of the binding part B1 is about 4 through 6 μm.

The diameter of the binding part B1 obtained by such calculation is a value no larger than ¼ of the diameter 24 μm of the phosphor particle PR based on the assumption described above. In other words, the dimensions in the X axis and the Y axis of the binding part B1 are each a value no larger than ¼ of the diameter of the phosphor particle PR.

As described hereinabove, by setting the dimension of the binding part B1 to the size described above with respect to the diameter of the phosphor particle PR, it is possible to make the area proportion described above no higher than 10%, and by extension, it is possible to increase the brightness in the optical system.

The size of such a binding part B1 can be achieved by adjusting the temperature when manufacturing the phosphor layer 54 although described later in detail. This point will be described in a method of manufacturing the wavelength conversion element 51.

Glass Content Rate in Phosphor Layer

Figure 8:
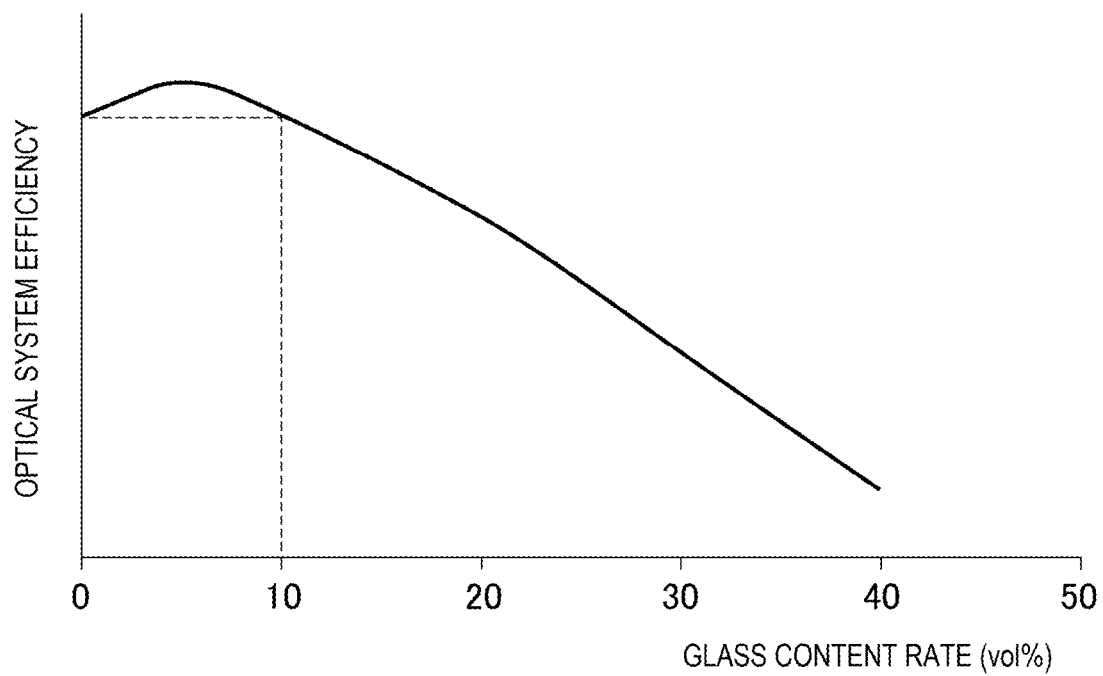
FIG. 8 is a graph showing a relationship between a glass content rate and optical system efficiency in the first embodiment.

FIG. 8 is a graph showing a relationship between a glass content rate of the phosphor layer 54 and optical system efficiency.

It should be noted that the glass content rate is represented by volume percent (vol %) of the binder BN in the phosphor layer 54. Specifically, the glass content rate is "100*(volume of glass)/((volume of glass)+(volume of phosphor particles))," and the volume of the voids SP is not included.

In other words, the glass content rate mentioned here is not a measured value of the wavelength conversion element 51 after being manufactured, but is a value based on the volume percent of the input of the binder BN and the phosphor particles PR in a paste preparation step S1 and a phosphor mixing step S2 (see FIG. 14) in the process of manufacturing the wavelength conversion element 51 described later.

In contrast, the optical system efficiency is "(the intensity of the light having been emitted from the phosphor layer 54, transmitted through the optical device 30 as the optical system, and then emitted from the projection optical device 36)/(the intensity of the excitation light with which the phosphor layer 54 has been irradiated)." Therefore, the optical system efficiency is neither "(the intensity of the light having been emitted from the phosphor layer 54 and then entered the optical device 30)/(the intensity of the excitation light with which the phosphor layer 54 has been irradiated)" nor the wavelength conversion efficiency expressed by "(the intensity of the light having been emitted from the phosphor layer 54)/(the intensity of the excitation light with which the phosphor layer 54 has been irradiated)."

In other words, the optical system efficiency is the efficiency including etendue, and can be rephrased as the light use efficiency in the optical device 30 of the projector 1.

As shown in FIG. 8, in the phosphor layer 54 related to the present embodiment, in a range in which the glass content rate is higher than 0 vol % and no higher than 10 vol %, the optical system efficiency is made higher compared to when the glass content rate is 0 vol %. Further, when the glass content rate is 10 vol %, the optical system efficiency takes substantially the same value as when the glass content rate is 0 vol %.

When the glass content rate exceeds 10 vol %, the optical system efficiency lowers compared to when the glass content rate is 0 vol %. It is conceivable that this is because the fluorescence spreads in the phosphor layer 54 while the loss caused by the fluorescence being reflected and refracted on the interface between the phosphor particle PR and the binder BN decreases as described above, the spread of the light when the fluorescence is emitted from the phosphor layer 54 increases, and the intensity of the light which can be used in the optical device 30 as the optical system decreases to appear as a difference in measurement value. Further, it is conceivable that the reason that the peak is shown in a range of 0 through 10% is that when the binder BN is extremely small in amount, the excitation light repeats the reflection and the refraction a number of times on the interface between the phosphor particle PR and the void SP (air), and thus, the excitation light is discharged from the phosphor layer 54 before exciting the phosphor.

Figure 9:
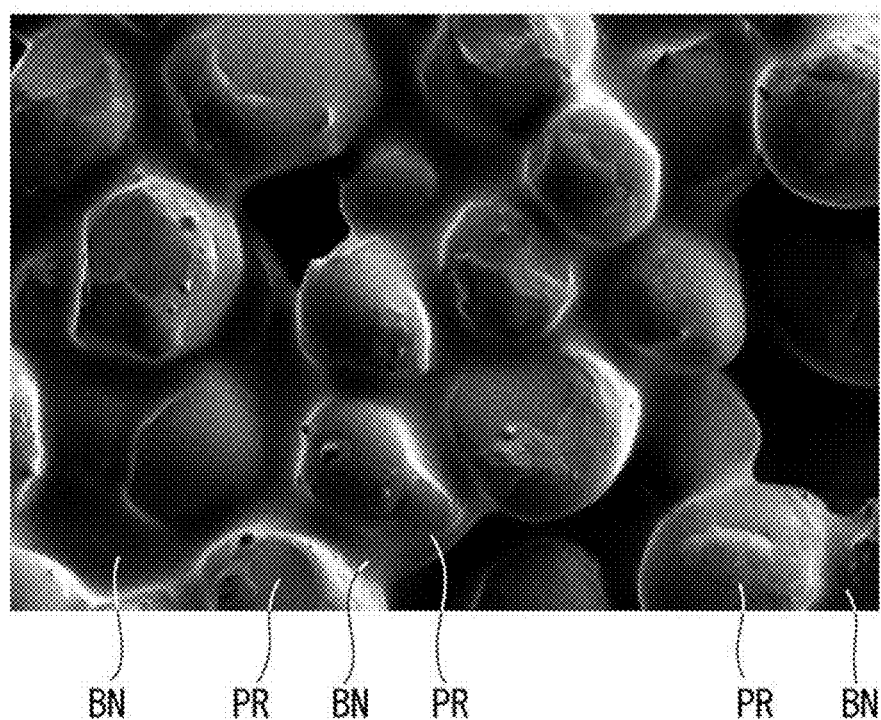
FIG. 9 is a diagram of an image showing a phosphor layer the glass content rate of which is 30 vol %, and which is formed at the calcination temperature of 1000° C. in the first embodiment.

FIG. 9 shows an image obtained when observing the phosphor layer the glass content rate of which is 30 vol %, and which is formed at calcination temperature of 1000° C. with an SEM (Scanning Electron Microscope). The image observed by the SEM is hereinafter abbreviated as an SEM image.

Figure 10:
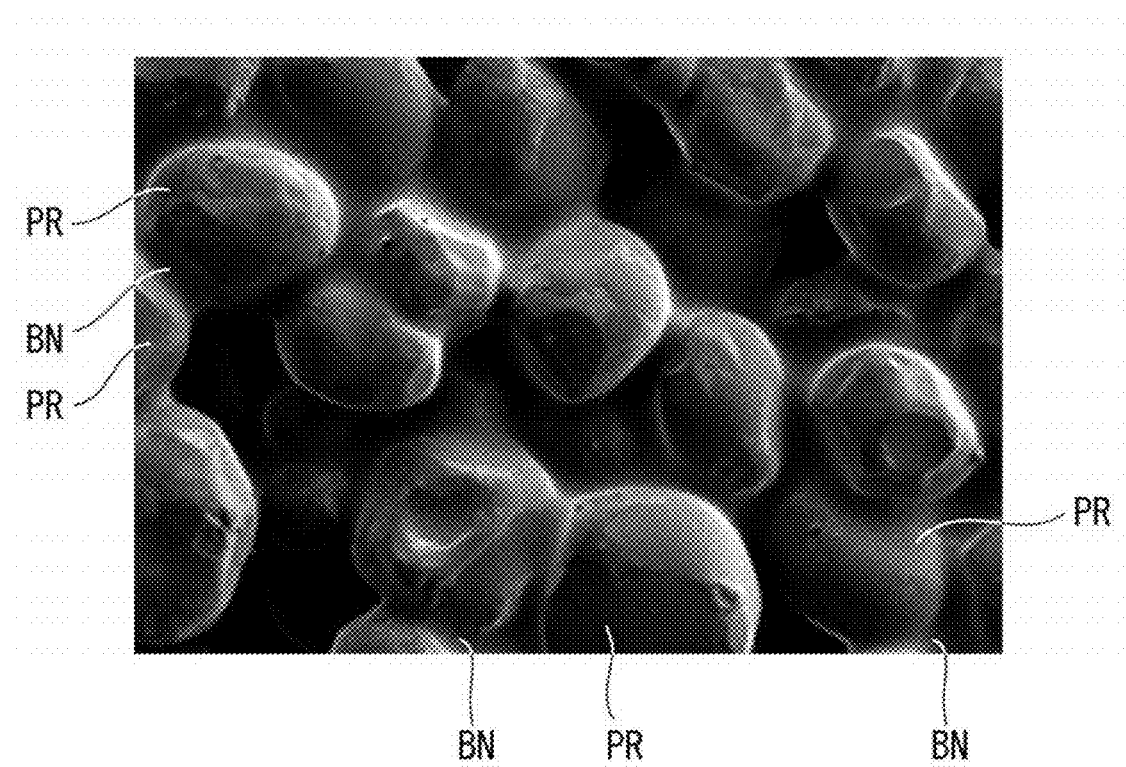
FIG. 10 is a diagram of an image showing a phosphor layer the glass content rate of which is 20 vol %, and which is formed at the calcination temperature of 1000° C. in the first embodiment.
Figure 11:
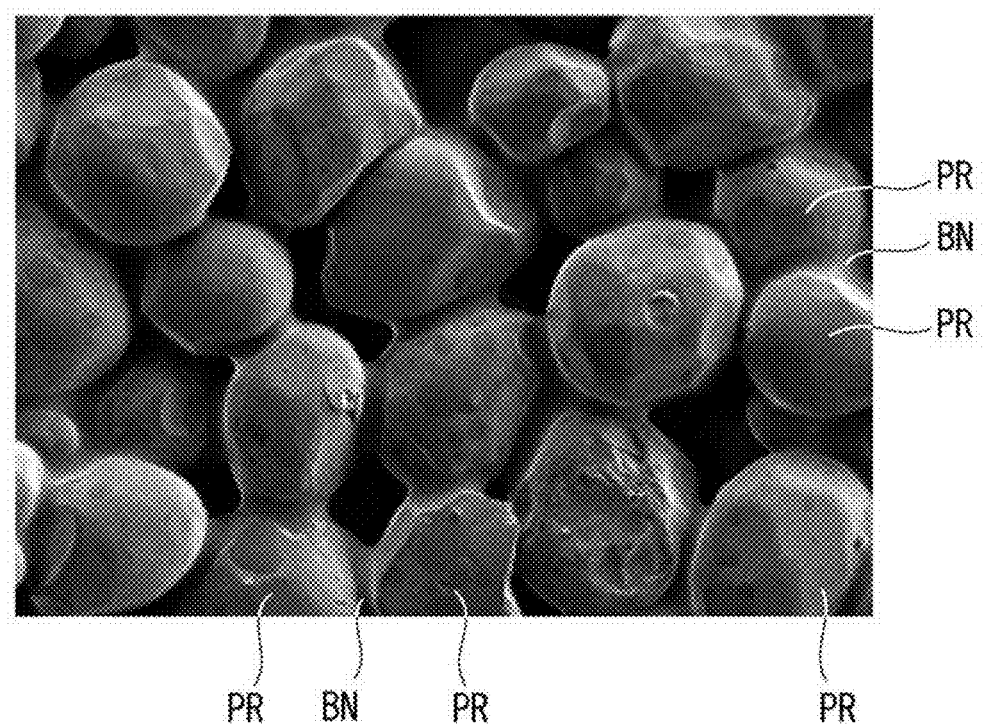
FIG. 11 is a diagram of an image showing a phosphor layer the glass content rate of which is 10 vol %, and which is formed at the calcination temperature of 1000° C. in the first embodiment.
Figure 12:
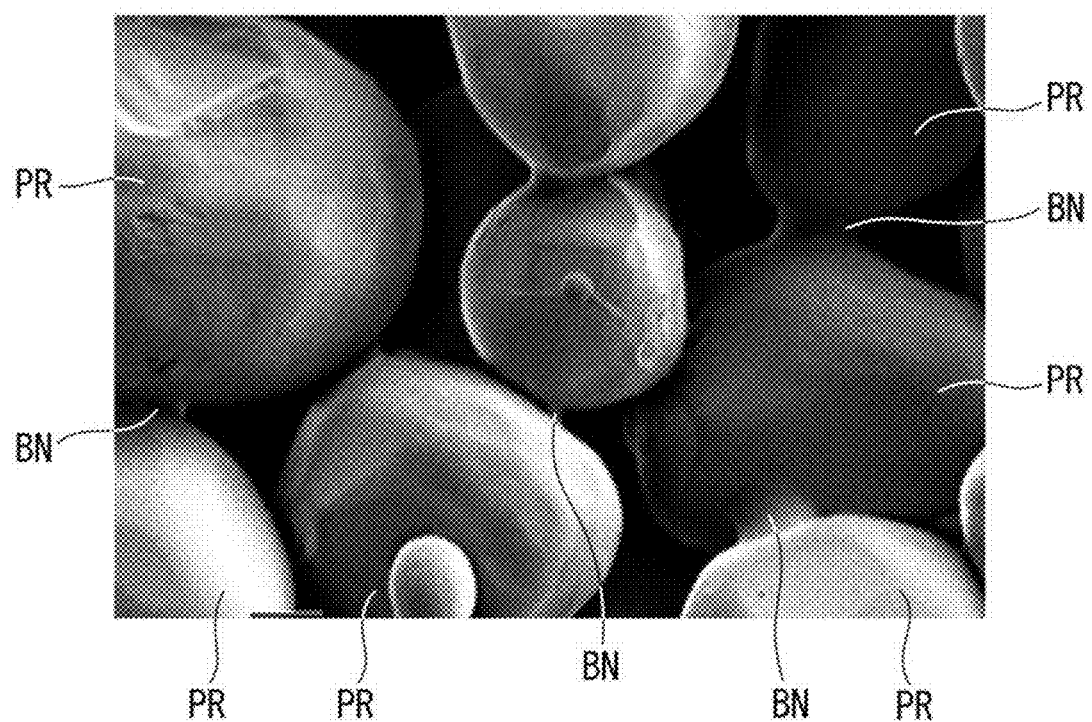
FIG. 12 is a diagram of an image showing a phosphor layer the glass content rate of which is 5 vol %, and which is formed at the calcination temperature of 1000° C. in the first embodiment.
Figure 13:
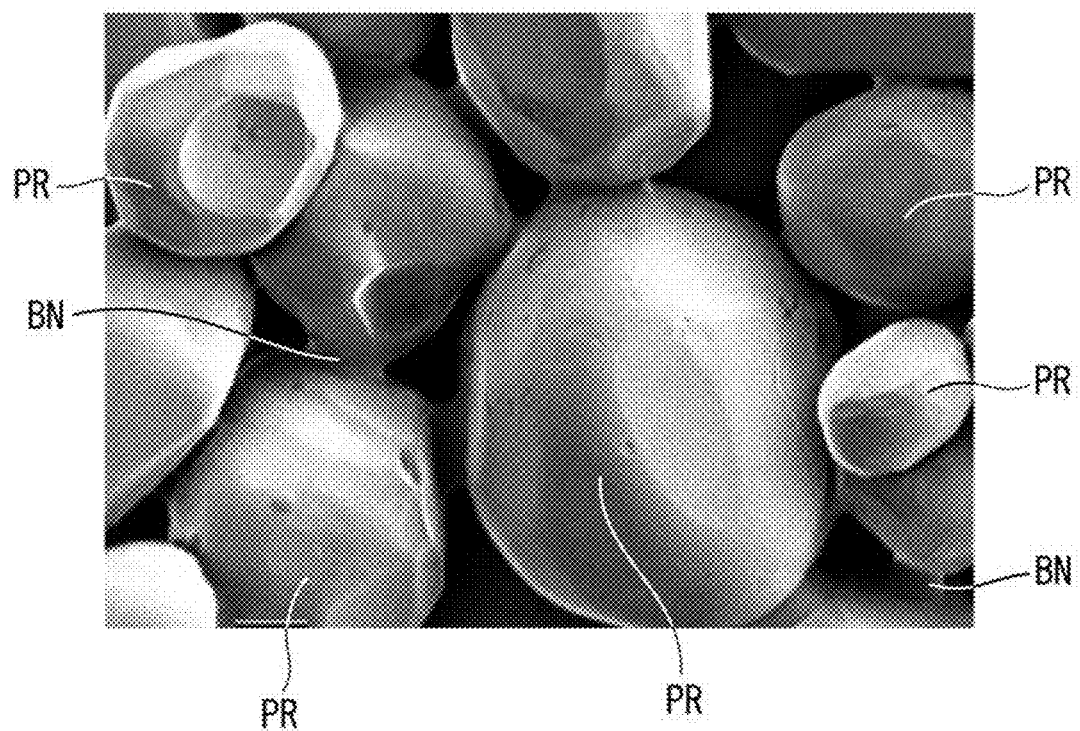
FIG. 13 is a diagram of an image showing a phosphor layer the glass content rate of which is 3 vol %, and which is formed at the calcination temperature of 1000° C. in the first embodiment.

FIG. 10 shows an SEM image of the phosphor layer the glass content rate of which is 20 vol %, and which is formed at the calcination temperature of 1000° C. FIG. 11 shows an SEM image of the phosphor layer the glass content rate of which is 10 vol %, and which is formed at the calcination temperature of 1000° C. FIG. 12 shows an SEM image of the phosphor layer the glass content rate of which is 5 vol %, and which is formed at the calcination temperature of 1000° C. FIG. 13 shows an SEM image of the phosphor layer the glass content rate of which is 3 vol %, and which is formed at the calcination temperature of 1000° C.

In the phosphor layer the glass content rate of which is 30 vol %, and the phosphor layer the glass content rate of which is 20 vol %, the surface of all of the phosphor particles PR is substantially completely covered with the binder BN as shown in FIG. 9 and FIG. 10. In particular, in the phosphor layer the glass content rate of which is 30 vol % shown in FIG. 9, the phosphor particles PR are buried in the binder BN. When the phosphor particles PR are covered with the binder BN as borosilicate glass in such a manner, the fluorescence generated in the phosphor particles PR becomes easy to propagate the binder BN, the spread of the light emitted from the phosphor layer broadens, and the optical system efficiency decreases as described above.

In contrast, in the phosphor layers the glass content rates of which are 10 vol %, 5 vol %, and 3 vol %, respectively, the binder BN is disposed between the phosphor particles PR adjacent to each other, and the phosphor particles PR are not completely covered with the binder BN as shown in FIG. 11 through FIG. 13. In particular, in the phosphor layers the glass content rates of which are 5 vol % and 3 vol %, respectively, the binder BN is only disposed between the phosphor particles PR adjacent to each other, and the surface of each of the phosphor particles PR is almost exposed as shown in FIG. 12 and FIG. 13.

As described above, since the phosphor particles PR adjacent to each other are bound to each other in a part of the surface with the binder BN, and the other part is exposed, the spread of the light emitted from the phosphor layer decreases, and thus, the optical system efficiency is enhanced.

Therefore, by setting the glass content rate to the value within the range higher than 0 vol % and no higher than 10 vol %, it is possible to constitute the phosphor layer capable of increasing the optical system efficiency compared to when the glass content rate is 0 vol %, and when the glass content rate is higher than 10 vol %.

Method of Manufacturing Wavelength Conversion Element

Figure 14:
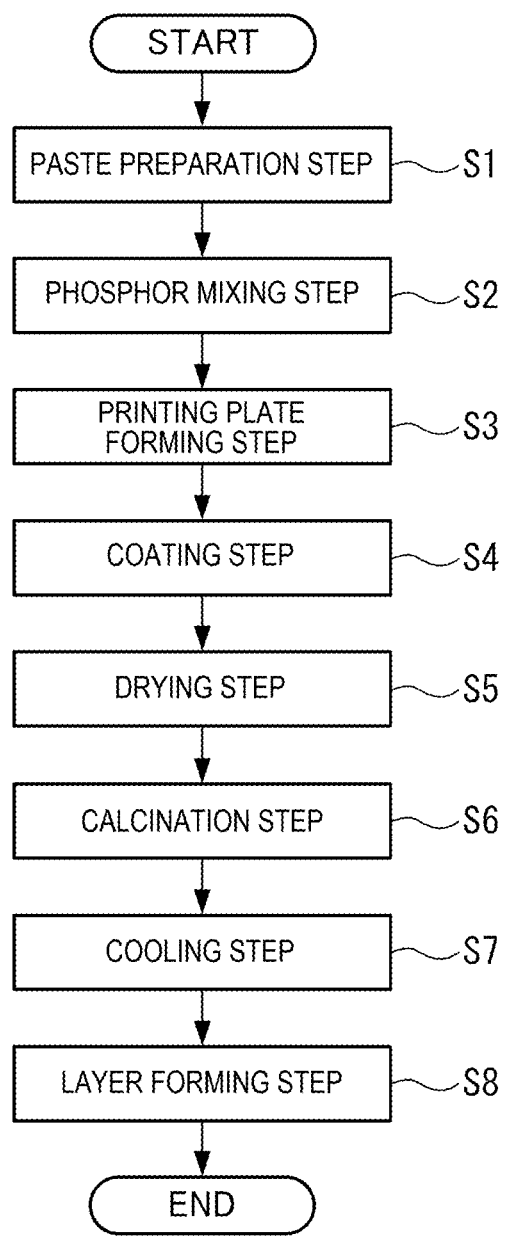
FIG. 14 is a flowchart showing a method of manufacturing the wavelength conversion element in the first embodiment.

FIG. 14 is a flowchart showing the method of manufacturing the wavelength conversion element 51.

The method of manufacturing the wavelength conversion element 51 including the phosphor layer 54 described above will be described.

As shown in FIG. 14, the method of manufacturing the wavelength conversion element 51 includes the paste preparation step S1, the phosphor mixing step S2, a printing plate forming step S3, a coating step S4, a drying step S5, a calcination step S6, a cooling step S7, and a layer forming step S8 to be executed in sequence. In other words, the method of manufacturing the wavelength conversion element 51 described hereinafter includes the manufacturing method according to the present disclosure.

The paste preparation step S1 and the phosphor mixing step S2 correspond to a preparation step.

The paste preparation step S1 is a step of mixing a binder constituent to form the binder BN after the calcination, resin such as ethyl cellulose, and a solvent for solving the binder constituent and the resin with each other to prepare a glass paste. It should be noted that the resin is for providing the paste with viscosity. Further, as the binder constituent, there can be cited what is obtained by fracturing the borosilicate glass including, for example, silica as much as 60% or more into particles having a diameter no larger than 1 μm.

The phosphor mixing step S2 is a step of preparing a mixture paste obtained by mixing the phosphor particles PR in the glass paste thus prepared. The ratio between the phosphor particles PR and the borosilicate glass as the binder constituent is set to a ratio within a range of 98:2 through 92:8 in the volume ratio. It should be noted that the range includes 98:2 and 92:8. More preferably, the ratio between the phosphor particles PR and the borosilicate glass is set to a ratio within a range of 97:3 through 95:5 in the volume ratio. The range includes 97:3 and 95:5. By adjusting the ratio between the phosphor particles PR and the borosilicate glass as described above, it is possible to set the glass content rate to a value within the range described above.

In the printing plate forming step S3, the printing plate is manufactured so that printing drops out in a circular shape.

In the coating step S4, the mixture paste prepared in the phosphor mixing step S2 is applied by printing with a thickness of 80 μm on a reflecting plate having a disk-like shape using the printing plate thus manufactured. The reflecting plate is the substrate 52 provided with the microscopic gas pockets for reflection disposed inside.

In the drying step S5, the mixture paste applied thereon is dried for a short time at around 100° C.

In the calcination step S6, the mixture paste thus dried is calcined for a short time while raising the temperature at the ratio of 10° C./minute up to 1000° C. by a firing furnace. When calcining the mixture paste in the calcination step S6, almost the whole of the resin and the solvent included in the mixture paste evaporates. It should be noted that the calcination temperature in the calcination step S6 will be described later in detail.

In the cooling step S7, the mixture paste thus calcined is cooled.

In the layer forming step S8, the antireflection layer 55 is formed on the phosphor layer 54 as the mixture paste thus cooled in the cooling step S7. Specifically, in the layer forming step S8, a dielectric film is formed on the first surface 541 which is a surface on an opposite side to the substrate 52 in the phosphor layer 54 and which the excitation light enters using vapor deposition or the like to thereby form the antireflection layer 55 on the first surface 541. Alternatively, as a method of attaching a layer on a curved surface located in an upper part of the phosphor layer 54 and an internal surface of the phosphor layer 54, it is possible to use CVD (Chemical Vapor Deposition) or ALD (Atomic Layer Deposition). Thus, it is possible to deliver a gas such as $SiO_2$ or $TiO_2$ as a dielectric substance into every corner of the inside of the phosphor layer 54 to deposit the film. Thus, the excitation light is prevented from being reflected by the surface of the phosphor particle PR even when the excitation light reaches the inside of the phosphor layer 54, and thus, it is possible to convert a larger amount of excitation light into the fluorescence.

Due to the manufacturing method including the steps S1 through S8 described hereinabove, there is manufactured the wavelength conversion element 51 having the phosphor layer 54 the area proportion and the glass content rate of which are higher than 0% and no higher than 10%.

Figure 15:
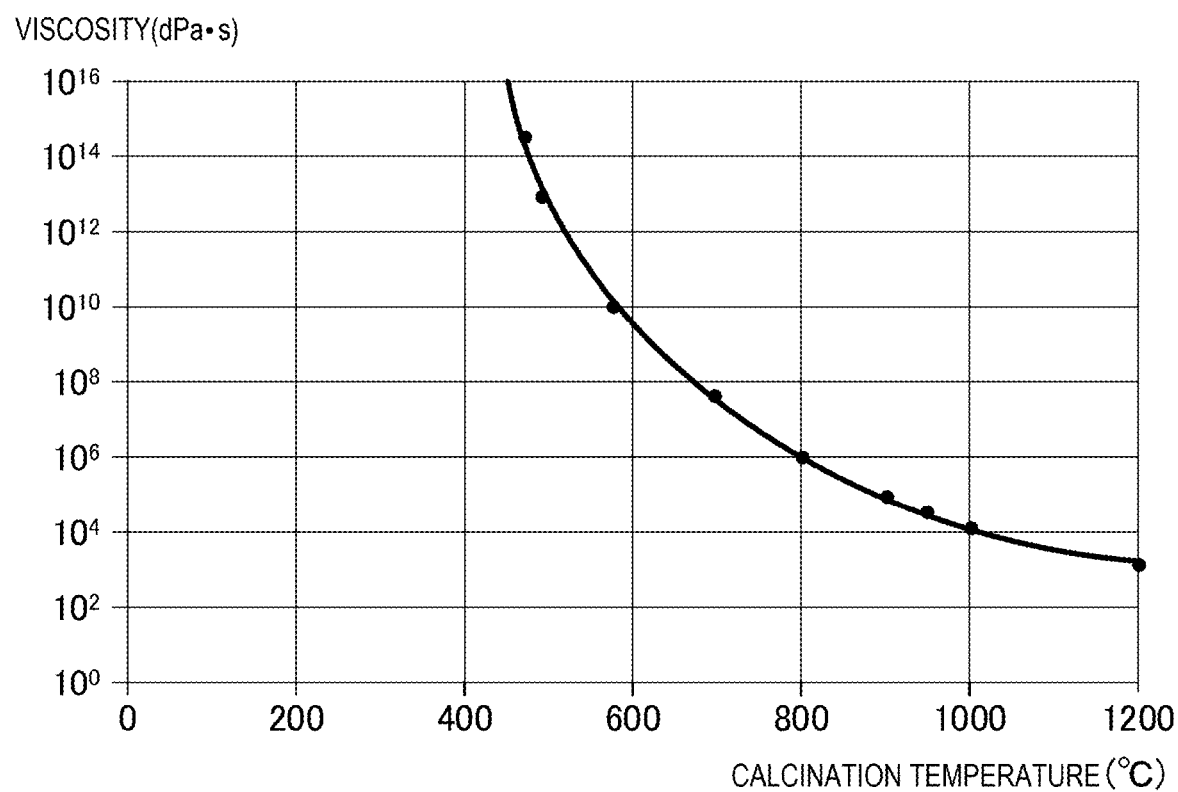
FIG. 15 is a graph showing a relationship between the calcination temperature and the viscosity of the glass in the first embodiment.

Relationship Between Calcination Temperature and Viscosity of Glass in Calcination Process FIG. 15 is a graph showing a relationship between the calcination temperature and the viscosity of the glass.

As shown in FIG. 15, the viscosity of the glass decreases as the temperature rises, and the force due to the viscosity of the glass weakens as the viscosity decreases. Further, assuming that the softening point as a temperature at which the glass starts to conspicuously soften to deform under its own weight, and at which the viscosity becomes about $10^{7}0.6$ dPa·s is 700° C., by making the calcination temperature in the calcination step S6 described above no lower than 800° C. which is 100° C. higher than the softening point, the viscosity of the glass becomes no higher than $10^6$ dPa·s ($=10^6$ P).

Hereinafter, there is shown an SEM image of the phosphor layer manufactured by calcining the mixture paste having the glass content rate of 5 vol % at the calcination temperature.

Figure 16:
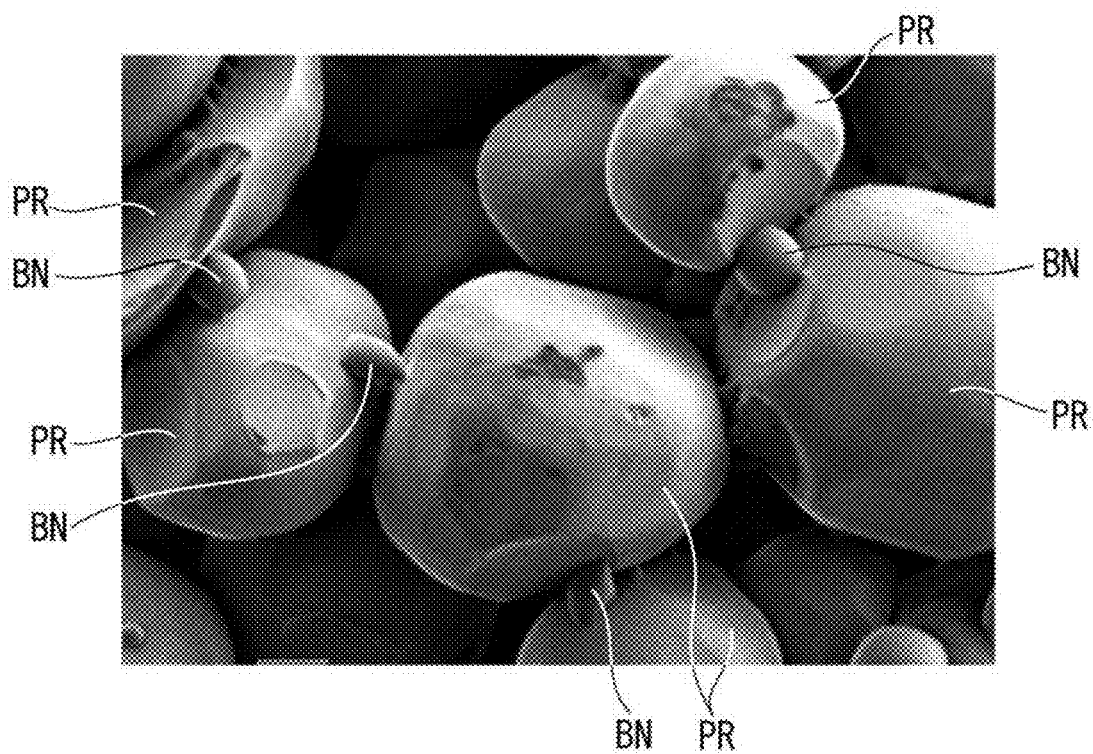
FIG. 16 is a diagram of an image showing a phosphor layer the glass content rate of which is 5 vol %, and which is formed at the calcination temperature of 750° C. in the first embodiment.
Figure 17:
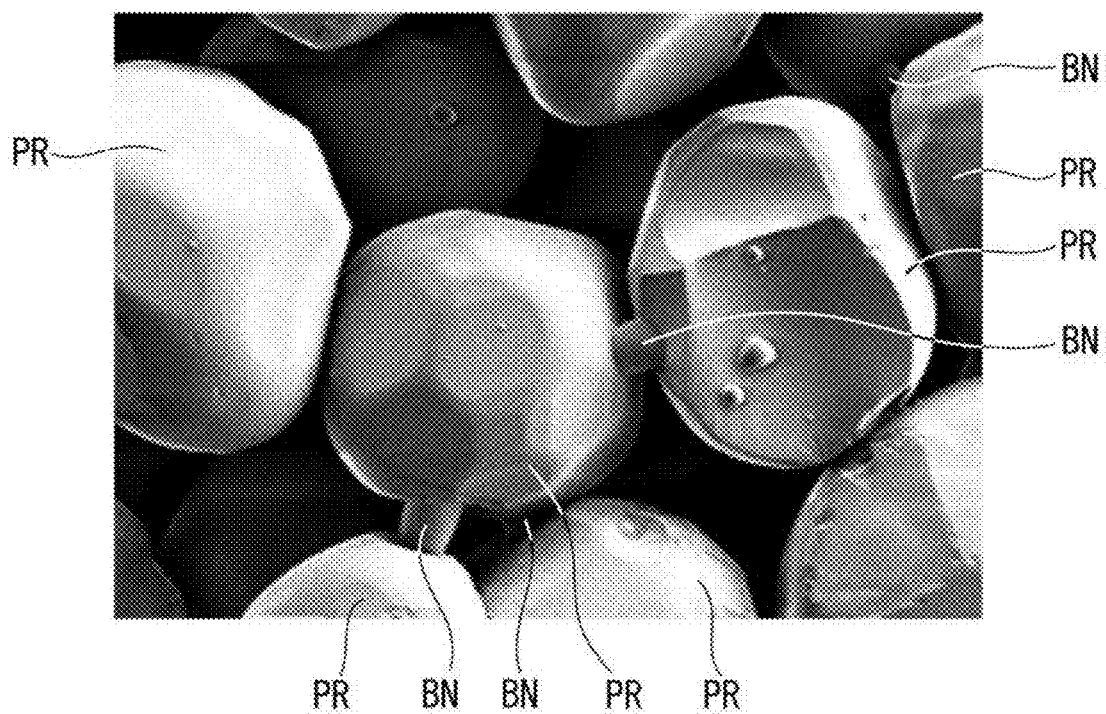
FIG. 17 is a diagram of an image showing a phosphor layer the glass content rate of which is 5 vol %, and which is formed at the calcination temperature of 800° C. in the first embodiment.
Figure 18:
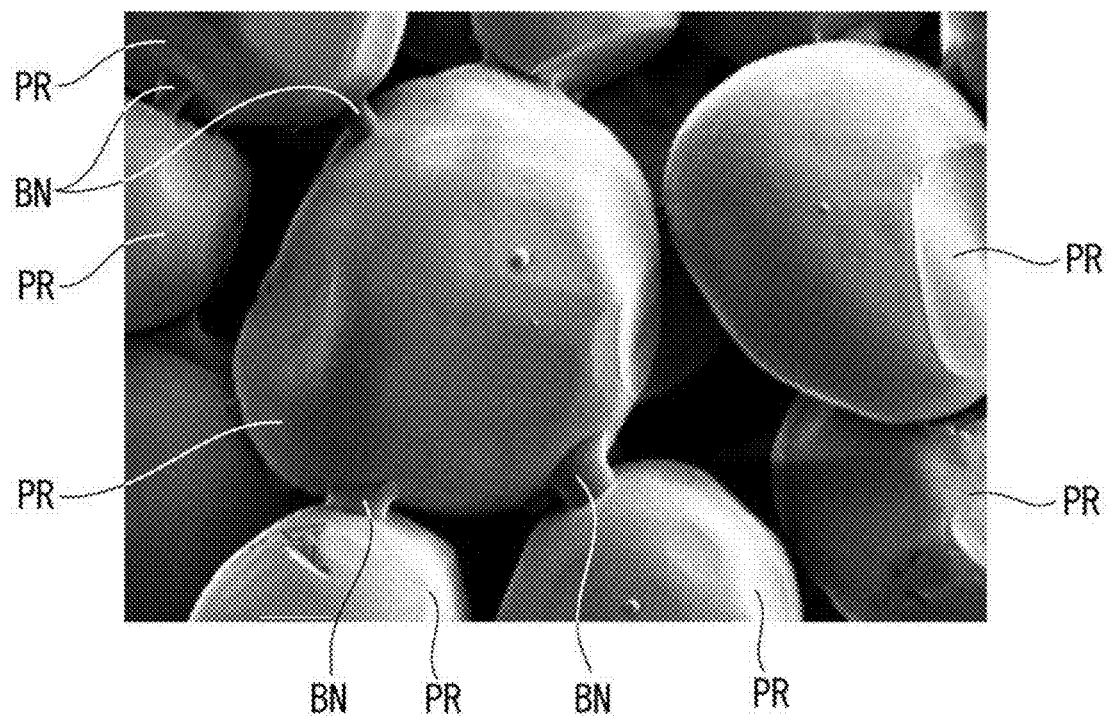
FIG. 18 is a diagram of an image showing a phosphor layer the glass content rate of which is 5 vol %, and which is formed at the calcination temperature of 850° C. in the first embodiment.
Figure 19:
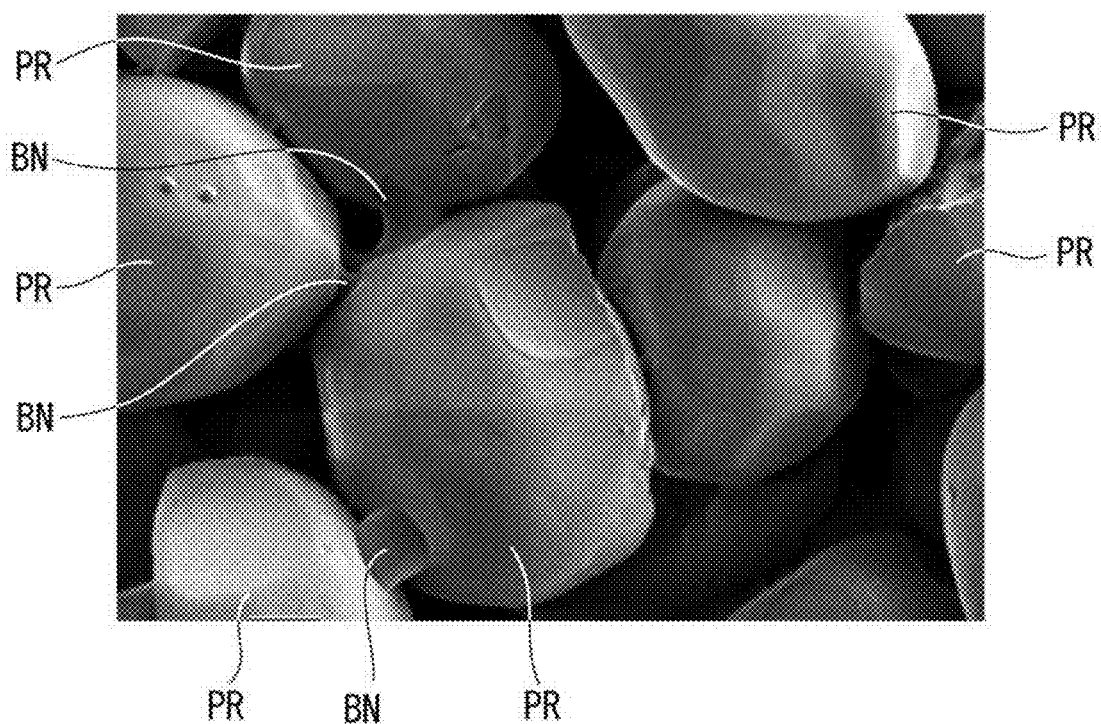
FIG. 19 is a diagram of an image showing a phosphor layer the glass content rate of which is 5 vol %, and which is formed at the calcination temperature of 900° C. in the first embodiment.
Figure 20:
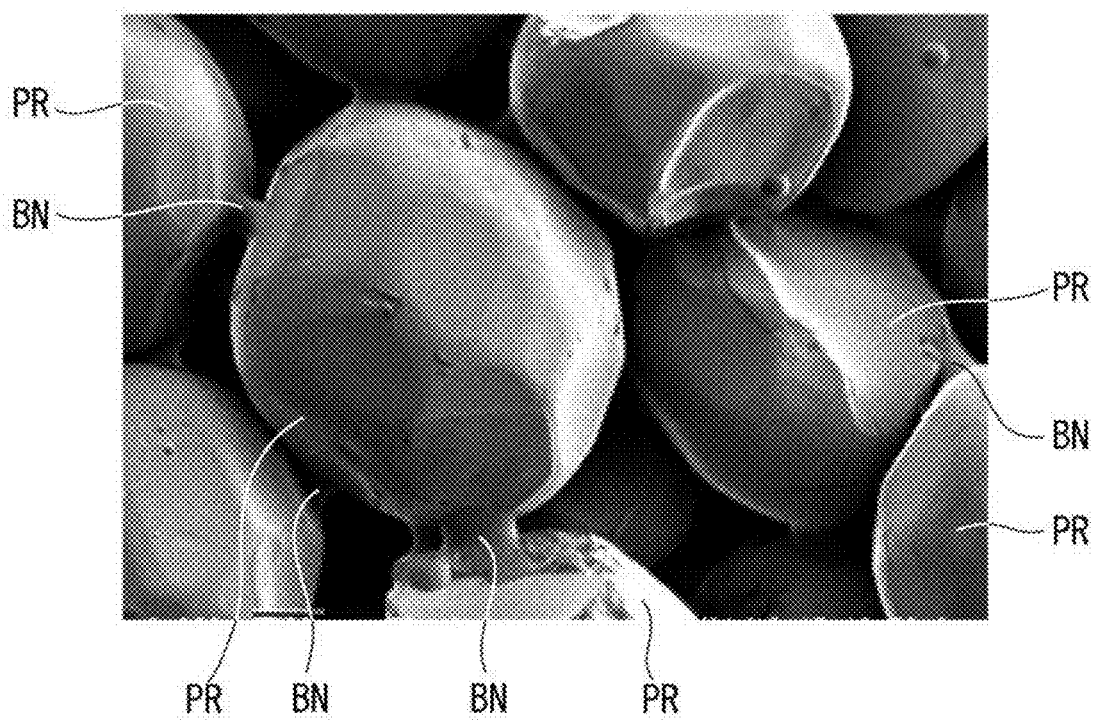
FIG. 20 is a diagram of an image showing a phosphor layer the glass content rate of which is 5 vol %, and which is formed at the calcination temperature of 950° C. in the first embodiment.

In other words, FIG. 16 shows an SEM image showing a phosphor layer the glass content rate of which is 5 vol %, and which is manufactured by being calcined at 750° C. FIG. 17 shows an SEM image showing a phosphor layer the glass content rate of which is 5 vol %, and which is manufactured by being calcined at 800° C. FIG. 18 shows an SEM image showing a phosphor layer the glass content rate of which is 5 vol %, and which is manufactured by being calcined at 850° C. FIG. 19 shows an SEM image showing a phosphor layer the glass content rate of which is 5 vol %, and which is manufactured by being calcined at 900° C. FIG. 20 shows an SEM image showing a phosphor layer the glass content rate of which is 5 vol %, and which is manufactured by being calcined at 950° C.

It should be noted that FIG. 12 shows the SEM image of the phosphor layer the glass content rate of which is 5 vol %, and which is manufactured by being calcined at 1000° C. as described above.

In the phosphor layer calcined at 750° C. close to the softening point of the glass, the size of the binding part B1 with respect to the diameter of the phosphor particle PR is substantially the same as described above as shown in FIG. 16. In other words, the size of the binding part B1 with respect to the diameter of the phosphor particle PR is no larger than ¼ of the diameter of the phosphor particle PR. However, since the binder BN has a granular form, and in addition, the surface is not smooth, the fluorescence and the excitation light having entered the binder BN are apt to be scattered. When the scattering of the fluorescence and the excitation light increases, the light path length of the fluorescence increases, and when the light path length of the fluorescence increases, the intensity of the fluorescence decreases since the frequency of occurrence of the self-absorption by the phosphor particles PR increases, and the excitation light is reflected to the outside of the phosphor layer 54 without exciting the phosphor particles PR as described above. Therefore, in the phosphor layer calcined at 750° C., the intensity of the fluorescence emitted from the phosphor layer decreases, and the optical system efficiency described above is apt to decrease.

In contrast, in the phosphor layer calcined at 800° C., the size of the binding part B1 with respect to the diameter of the phosphor particle PR is substantially the same as described above as shown in FIG. 17. In other words, the size of the binding part B1 with respect to the diameter of the phosphor particle PR is no larger than ¼ of the diameter of the phosphor particle PR. However, the size of the binding part B1 in the phosphor layer calcined at 800° C. becomes smaller than the size of the binding part B1 in the phosphor layer calcined at 750° C. Besides the above, since the calcination temperature is 100° C. higher than the softening point, and the viscosity is sufficiently low, the surface of the binder BN is made smooth, and the fluorescence having entered the binder BN is difficult to scatter. Further, as shown in FIG. 17, when the calcination temperature is 800° C., the viscosity of the glass becomes no higher than $10^6$ dPa·s (=$10^6$ P), and since the viscosity is sufficiently low, the surface of the binder BN is made smooth, and thus, the fluorescence having entered the binder BN is difficult to scatter. Therefore, the occurrence of the self-absorption by the phosphor particles PR is suppressed, and the intensity of the fluorescence is prevented from decreasing compared to the phosphor layer calcined at 750° C.

Substantially the same as above also applies to the phosphor layers calcined at 850° C., 900° C., and 950° C. shown in FIG. 18 through FIG. 20, respectively, and the phosphor layer calcined at 1000° C. shown in FIG. 12. In other words, since the viscosity of the glass decreases as the calcination temperature rises, the size of the binding part B1 decreases, and in addition, the thickness of the binder BN as the dimension in the direction connecting the phosphor particles PR to be bound also decreases. Further, the surface of the binder BN in the phosphor layer becomes smoother, and the scattering of the fluorescence is further suppressed. It is conceivable that substantially the same is applied to a phosphor layer calcined at a temperature exceeding 1000° C.

In particular, when the calcination temperature becomes no higher than 900° C., the viscosity becomes no higher than $10^5$ dPa·s, the fluidity of the glass is enhanced, and the binder BN becomes in a state which is desirable from an optical point of view and a viewpoint of thermal conduction, and in which the binder BN has a streamline shape to bond the phosphor particles PR adjacent to each other. Further, it is understood from FIG. 12 that when the calcination temperature becomes 1000° C., the viscosity becomes $10^4$ dPa·s, and there is achieved the bonding state with near-complete fluidity.

On the other hand, when the calcination temperature in the calcination step S6 described above is made no lower than 1100° C., Ce ions as the activator agent of the phosphor are oxidized to thereby be deactivated. Therefore, from a viewpoint of the manufacturing process, it is more preferable for the calcination temperature in the calcination step S6 to be no lower than 800° C. and no higher than 1100° C. (100° C. or more and 400° C. or less higher than the softening point). Among the above, when the calcination temperature in the calcination step S6 is no lower than 900° C. and no higher than 1100° C. (200° C. or more and 400° C. or less higher than the softening point), the viscosity no higher than $10^5$ dPa·s can preferably be realized. Further, it is more desirable for the calcination temperature in the calcination step S6 to be no lower than 950° C. and no higher than 1050° C. (250° C. or more and 350° C. or less higher than the softening point). This is a temperature for realizing the viscosity of $10^4$ dPa·s, the phosphor layer is higher in emission efficiency, and the optical system efficiency described above including the optical device 30 is high.

Advantages of First Embodiment

According to a process of manufacturing the projector 1 and the wavelength conversion element 51 related to the present embodiment described hereinabove, the following advantages can be exerted.

The projector 1 is provided with the light source device 4, the light modulation devices 343 (343B, 343G, and 343R) for modulating the light emitted from the light source device 4 in accordance with the image information, and the projection optical device 36 for projecting the light modulated by the light modulation devices 343. The light source device 4 is provided with the light source 411 for emitting the excitation light, and the wavelength conversion element 51 for performing the wavelength conversion on the excitation light to generate the fluorescence having a longer wavelength than the wavelength of the excitation light. The wavelength conversion element 51 is provided with the phosphor layer 54 having the plurality of phosphor particles PR, and the binder BN for binding one phosphor particle PR1 and the other phosphor particle PR2 adjacent to each other out of the plurality of phosphor particles PR, the antireflection layer 55 disposed on the incident side of the excitation light with respect to the phosphor layer 54, and the substrate 52 on which the phosphor layer 54 is disposed. The binder BN includes the glass, and the binder BN binds a part of the surface of the one phosphor particle PR1 and a part of the surface of the other phosphor particle PR2 to each other.

According to such a configuration, the binder BN is not bonded to the entire surface of each of the phosphor particles PR, but is bonded to only a part of the surface in each of the phosphor particles PR. This makes it possible to reduce the area of the binding part B1 to be bonded to the binder BN in the surface of the phosphor particle PR. In other words, it is possible to increase the area of the region having contact with the void SP (air) in the surface of the phosphor particle PR. Thus, since it is possible to decrease the intensity of the fluorescence propagating the binder BN, it is possible to decrease the spread of the light emitted from the phosphor layer 54, and by extension, from the wavelength conversion element 51. Therefore, it is possible to enhance the brightness in the optical device 30 as the optical system, and thus, it is possible to increase the optical system efficiency described above.

Further, on the incident side of the excitation light with respect to the phosphor layer 54, there is disposed the antireflection layer 55. Specifically, on the first surface 541 as the plane of incidence of the excitation light in the phosphor layer 54, there is disposed the antireflection layer 55. According to this configuration, it is possible to make the excitation light entering the wavelength conversion element 51 easy to enter the phosphor layer 54, and thus, it is possible to reduce the intensity of the excitation light which is reflected by the first surface 541 and fails to enter the phosphor layer 54. Therefore, it is possible to enhance the wavelength conversion efficiency of the wavelength conversion element 51, and thus, it is possible to increase the intensity of the fluorescence to be emitted from the wavelength conversion element 51 compared to the wavelength conversion element 51 which is not provided with the antireflection layer 55.

When manufacturing the phosphor layer 54, the proportion of the volume of the binder BN to the total volume of the sum of the volumes of the phosphor particles PR and the sum of the volumes of the binder BN is larger than 0 vol % and no larger than 10 vol %. In other words, the glass content rate in the mixture paste prepared when manufacturing the phosphor layer 54 is larger than 0 vol % and no larger than 10 vol %.

According to such a configuration, as described above, it is possible to reduce the area of the binding part B1 to be bonded to the binder BN in the surface of the phosphor particle PR. Thus, it is possible to decrease the intensity of the fluorescence propagating inside the binder BN, and it is possible to decrease the spread of the fluorescence emitted from the phosphor layer 54, and by extension, from the wavelength conversion element 51. Therefore, it is possible to enhance the brightness in the optical device 30 as the optical system, and thus, it is possible to increase the optical system efficiency described above.

The method of manufacturing the wavelength conversion element includes the preparation step of preparing the mixture obtained by mixing the phosphor particles and the binder including the glass with each other, the coating step of applying the mixture on the substrate, the calcination step of calcining the substrate coated with the mixture, and the layer forming step of forming the antireflection layer on the surface on the opposite side to the substrate in the mixture thus calcined, and the calcination temperature in the calcination step is 100° C. or more higher than the softening point of the glass. Specifically, the method of manufacturing the wavelength conversion element 51 includes the paste preparation step S1 and the phosphor mixing step S2 as the preparation step, the coating step S4, the calcination step S6, and the layer forming step S8. In the paste preparation step S1 and the phosphor mixing step S2, there is prepared the mixture paste as the mixture obtained by mixing the phosphor particles PR and the binder including the glass with each other. In the coating step S4, the mixture paste is applied on the substrate 52. In the calcination step S6, the substrate 52 coated with the mixture paste is calcined. In the layer forming step S8, the antireflection layer 55 is formed on the first surface 541 on the opposite side to the substrate 52 in the phosphor layer 54 as the mixture paste thus calcined. Further, the calcination temperature in the calcination step S6 is 100° C. or more higher than the softening point of the glass.

In other words, the method of manufacturing the wavelength conversion element includes the preparation step of preparing the mixture obtained by mixing the phosphor particles and the binder including the glass with each other, the coating step of applying the mixture on the substrate, the calcination step of calcining the substrate coated with the mixture, and the layer forming step of forming the antireflection layer on the surface on the opposite side to the substrate in the mixture thus calcined, and the viscosity of the glass in the calcination step is no higher than $10^6$ dPa·s. Specifically, the method of manufacturing the wavelength conversion element 51 includes the paste preparation step S1, the phosphor mixing step S2, the coating step S4, the calcination step S6, and the layer forming step S8 described above, and the viscosity of the glass in the calcination step S6 is no higher than $10^6$ dPa·s.

Second Embodiment

Then, a second embodiment of the present disclosure will be described.

The projector according to the present embodiment is provided with substantially the same configuration as that of the projector 1 described in the first embodiment, but is different therefrom in the configuration of the wavelength conversion element. It should be noted that in the following description, a part which is the same or substantially the same as the part having already been described is denoted by the same reference symbol, and the description thereof will be omitted.

Figure 21:
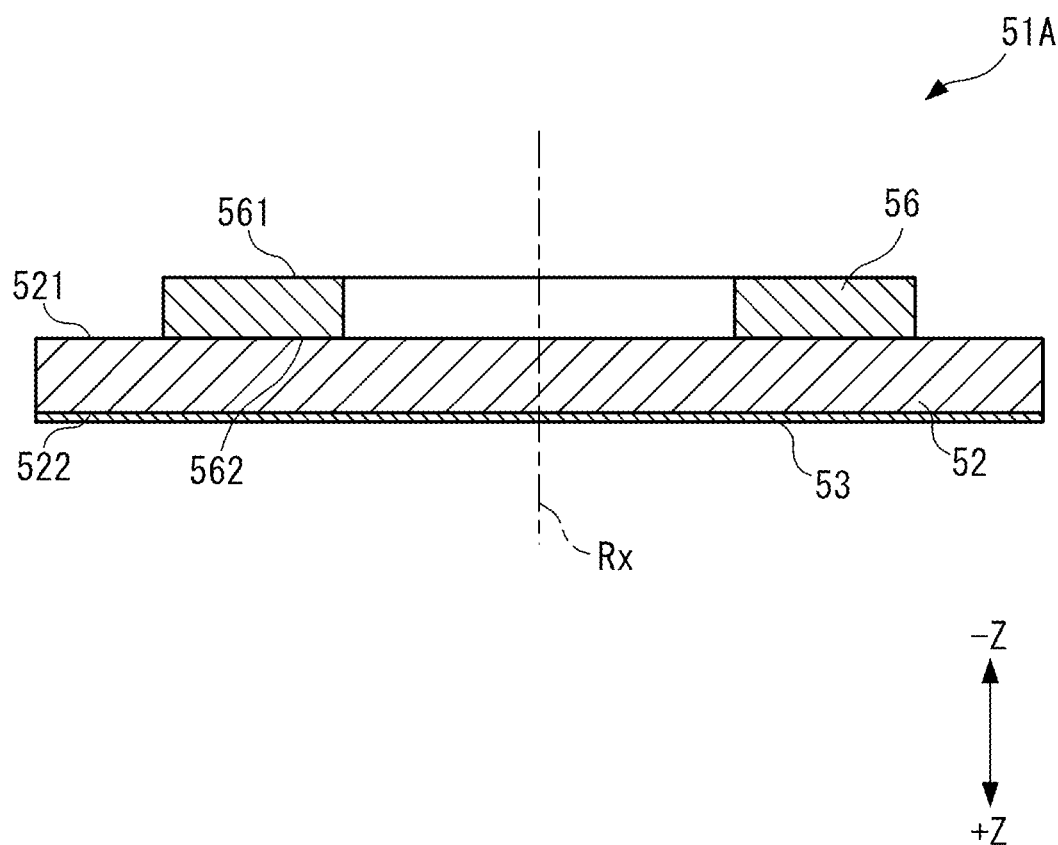
FIG. 21 is a schematic diagram showing a cross-sectional surface of a wavelength conversion element provided to a projector according to a second embodiment.

FIG. 21 is a schematic diagram showing a cross-sectional surface of a wavelength conversion element 51A provided to the projector according to the present embodiment.

The projector according to the present embodiment has substantially the same configuration and functions as those of the projector 1 except the point that the wavelength conversion element 51A is provided instead of the wavelength conversion element 51. In other words, in the present embodiment, the light source device 4 has the wavelength conversion element 51A instead of the wavelength conversion element 51.

As shown in FIG. 21, the wavelength conversion element 51A has substantially the same configuration and functions as those of the wavelength conversion element 51 except the point that the wavelength conversion element 51A has a phosphor layer 56 instead of the phosphor layer 54, but does not have the antireflection layer 55. Specifically, the wavelength conversion element 51A has the substrate 52, the radiator sheet 53, and the phosphor layer 56. The wavelength conversion element 51A is manufactured using a manufacturing method described later.

Configuration of Phosphor Layer

Figure 22:
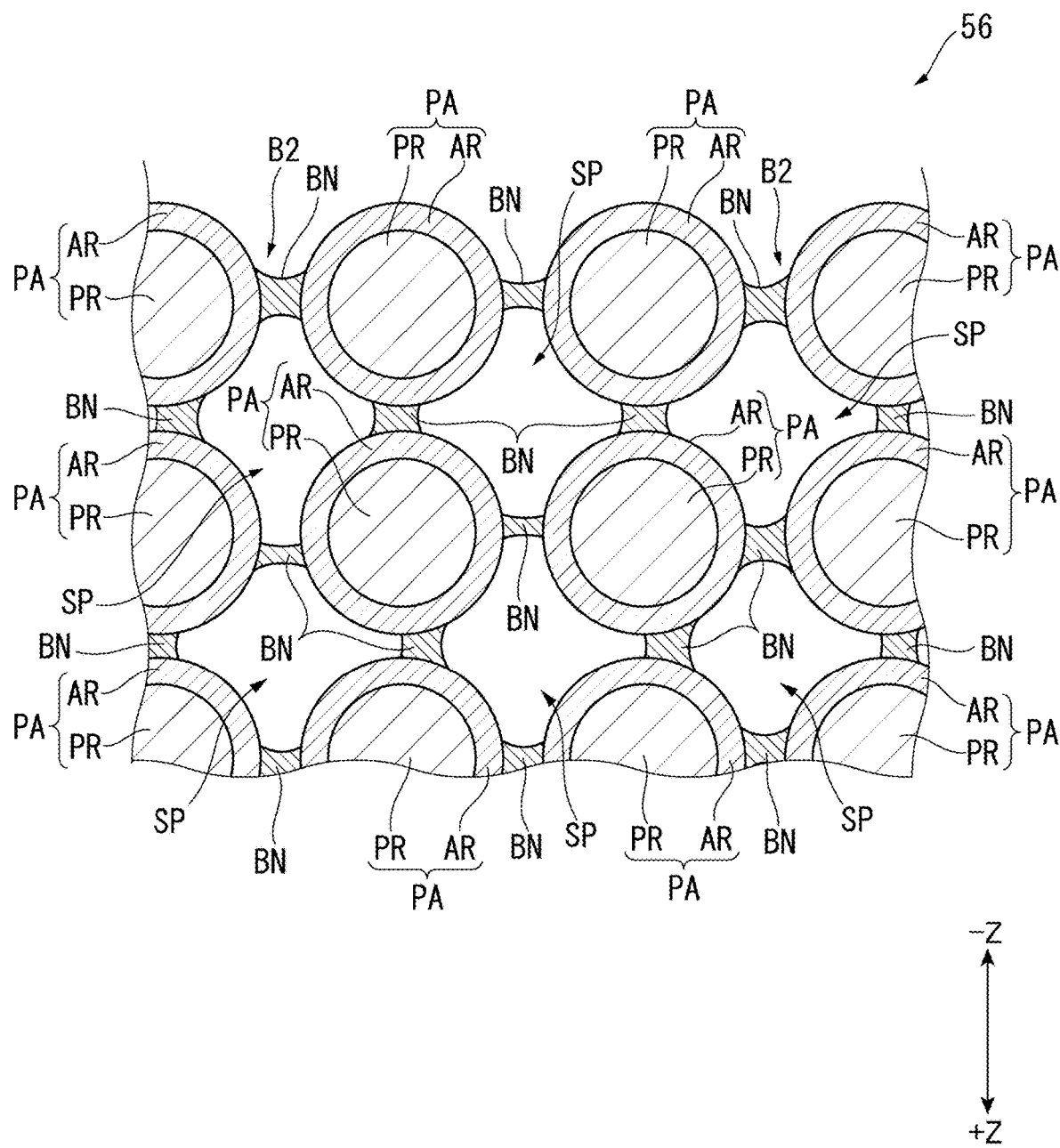
FIG. 22 is a schematic diagram showing a binding state of a plurality of phosphor particles and a binder in the second embodiment.
Figure 23:
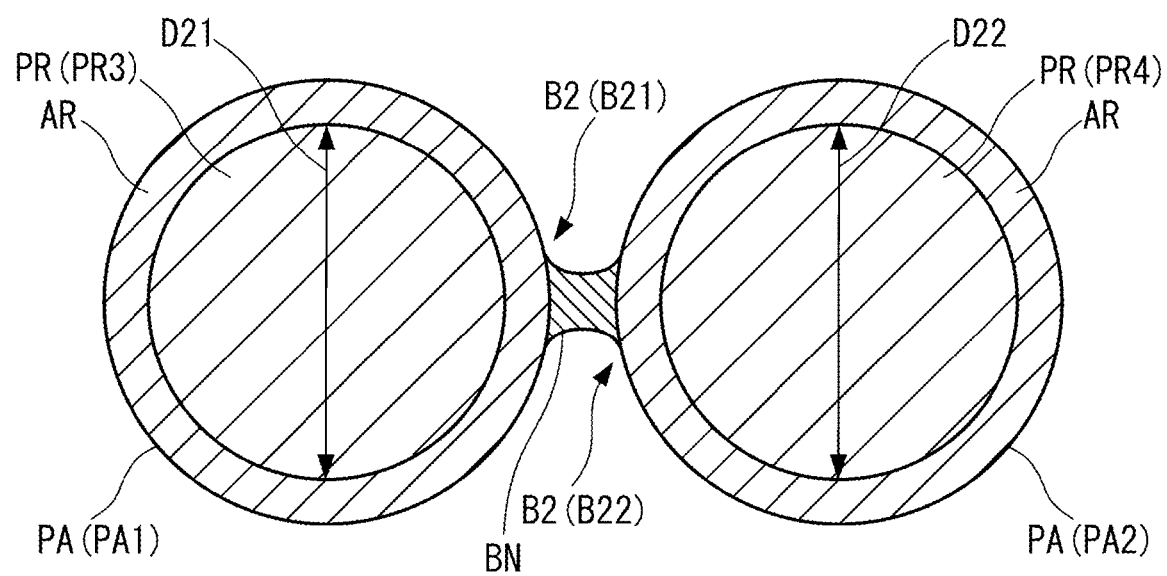
FIG. 23 is a schematic diagram showing a binding state of the phosphor particles with a binder in the second embodiment.

FIG. 22 is a schematic diagram showing the binding state of the plurality of phosphor particles PR and the binder BN constituting the phosphor layer 56. Further, FIG. 23 is a schematic diagram showing a binding state of the phosphor particles PR adjacent to each other with the binder BN.

Similarly to the phosphor layer 54, the phosphor layer 56 is excited by the excitation light entering the phosphor layer 56 to emit the fluorescence as the light different in wavelength from the excitation light. The phosphor layer 56 is held by the substrate 52 located on the +Z direction side with respect to the phosphor layer 56.

The phosphor layer 56 has a first surface 561 as a surface on the −Z direction side, and a second surface 562 as a surface on the +Z direction side, and a surface on an opposite side to the first surface 561.

The first surface 561 is a plane of incidence which the excitation light enters, and is an exit surface from which the fluorescence is emitted. The second surface 562 is an opposed surface opposed to the first surface 521 of the substrate 52.

Such a phosphor layer 56 includes a plurality of particles PA, the binder BN including glass, and the voids SP, and is constituted by the plurality of particles PA bound to each other with the binder BN.

The glass content rate in the phosphor layer 56 is a value within a range no lower than 0 vol % and no higher than 10 vol % similarly to the phosphor layer 54. It should be noted that the definition of the glass content rate in the present embodiment is substantially the same as described above.

Configuration of Particles

As shown in FIG. 22 and FIG. 23, the particles PA each have the phosphor particle PR and an antireflection layer AR disposed on the surface of the phosphor particle PR. In other words, the phosphor layer 56 has the plurality of phosphor particles PR, the binder BN for binding the phosphor particles PR adjacent to each other out of the plurality of phosphor particles PR to each other, and the antireflection layer AR disposed on the surface of each of the phosphor particles PR.

The antireflection layer AR prevents the excitation light entering the phosphor particle PR from being reflected by the surface of the particle PA to thereby make the excitation light easy to enter the phosphor particle PR. In the method of manufacturing the wavelength conversion element 51 described later, the antireflection layer AR is formed on the surface of each of the phosphor particles PR before being mixed with the binder BN. Therefore, the antireflection layer AR is formed on substantially the entire surface of each of the phosphor particles PR. Such an antireflection layer AR can be a single layer film made of, for example, magnesium fluoride, or can also be a multilayered film obtained by stacking titanium oxide and silicon oxide on one another.

It should be noted that substantially the entire surface of the phosphor particle PR on which the antireflection layer AR is formed includes the entire surface of the phosphor particle PR. In other words, providing the antireflection layer AR is formed in a range which can be called substantially the entire surface on the surface of the phosphor particle PR, the antireflection layer AR is not necessarily required to be formed on the entire surface of the particle PA.

As shown in FIG. 23, in the particle PA, the binder BN is bonded to a part of the surface. In other words, the binder BN is bonded to a part of the surface of the phosphor particle PR on which the antireflection layer AR has been disposed. Specifically, the binder BN is bonded to the antireflection layer AR in some cases, and in other cases, the binder BN is bonded to the surface of the phosphor particle PR.

Therefore, out of the phosphor particles PR adjacent to each other, the binder BN binds at least any one of the pairs of the surface of one phosphor particle PR (PR3) and the surface of the other phosphor particle PR (PR4), the antireflection layer AR disposed on the surface of the one phosphor particle PR (PR3) and the antireflection layer AR disposed on the surface of the other phosphor particle PR (PR4), and the surface of the one phosphor particle PR (PR3) and the antireflection layer AR disposed on the surface of the other phosphor particle PR (PR4).

In other words, the phosphor particles PR each have a binding part B2 bound to another phosphor particle PR via the binder BN. Further, in the surface of the phosphor particle PR, a region other than the binding part B2 has contact with the void SP (air), or has contact with the void SP (air) via the antireflection layer AR.

Here, out of the plurality of particles PA, the particles PA adjacent to each other are defined as the particle PA1, PA2, the phosphor particle PR constituting the particle PA1 is defined as the phosphor particle PR3, and the phosphor particle PR constituting the particle PA2 is defined as the phosphor particle PR4. Further, the binding part B2 in the phosphor particle PR3 is defined as the binding part B21, and the binding part B2 in the phosphor particle PR4 is defined as the binding part B22.

In this case, the proportion of the area of the binding part B21 to the surface area of the phosphor particle PR3 is no higher than 10%, and is specifically no lower than 3% and no higher than 5% similarly to the area proportion in the first embodiment. Similarly, the proportion of the area of the binding part B22 to the surface area of the phosphor particle PR4 is also no higher than 10%, and is specifically no lower than 3% and no higher than 5%.

Further, the dimension in the Y axis of the binding part B21 is no larger than ¼ of the diameter D21 of the phosphor particle PR3, and although not shown in the drawing, the dimension in the X axis of the binding part B21 is no larger than ¼ of the diameter D21 of the phosphor particle PR3. In other words, the dimension in the Y axis of the binding part B21 is no larger than ¼ of the size in the Y axis of the phosphor particle PR3, and although not shown in the drawing, the dimension in the X axis of the binding part B21 is no larger than ¼ of the size in the X axis of the phosphor particle PR3. Further, the dimension in the Y axis of the binding part B22 is no larger than ¼ of the diameter D22 of the phosphor particle PR4, and although not shown in the drawing, the dimension in the X axis of the binding part B22 is no larger than ¼ of the diameter D22 of the phosphor particle PR4. In other words, the dimension in the Y axis of the binding part B22 is no larger than ¼ of the size in the Y axis of the phosphor particle PR4, and although not shown in the drawing, the dimension in the X axis of the binding part B22 is no larger than ¼ of the size in the X axis of the phosphor particle PR4.

Further, the thickness of the binder BN, namely the dimension of the binder BN in a direction connecting the center of the phosphor particle PR3 and the center of the phosphor particle PR4 to each other, is no larger than ¹/₁₀ of the diameter of the phosphor particle PR.

Method of Manufacturing Wavelength Conversion Element

Figure 24:
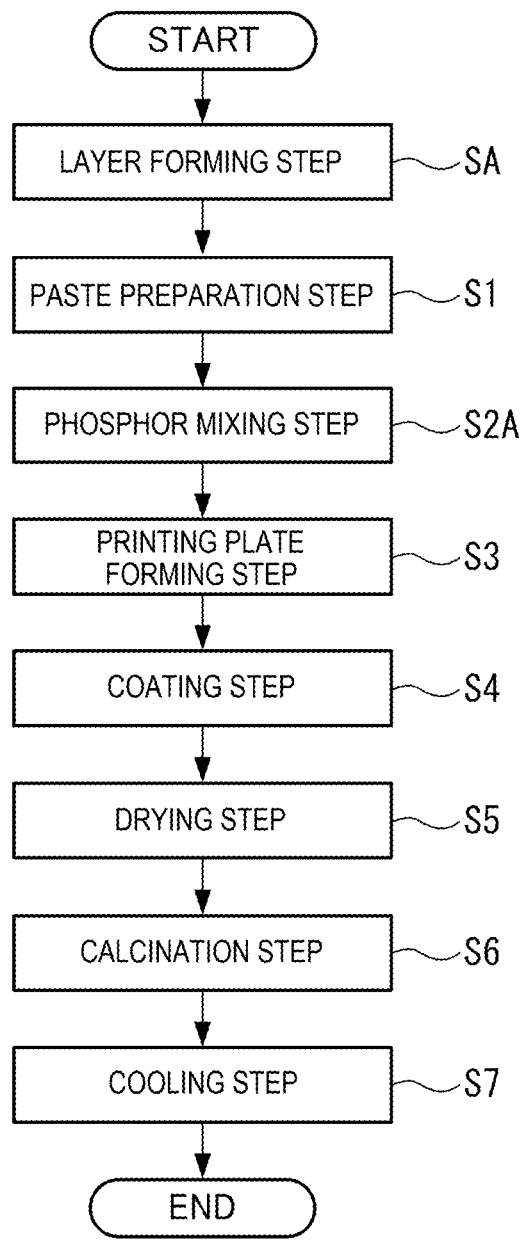
FIG. 24 is a flowchart showing a method of manufacturing the wavelength conversion element in the second embodiment.

FIG. 24 is a flowchart showing the method of manufacturing the wavelength conversion element 51A.

As shown in FIG. 24, the method of manufacturing the wavelength conversion element 51A includes a layer forming step SA, the paste preparation step S1, a phosphor mixing step S2A, the printing plate forming step S3, the coating step S4, the drying step S5, the calcination step S6, and the cooling step S7 to be executed in sequence.

The layer forming step SA is a step of forming the antireflection layer AR on each of the phosphor particles PR to prepare the particles PA to be mixed with the binder constituent and so on in the phosphor mixing step S2A. In other words, in the layer forming step SA, there is formed the antireflection layer AR on the surface of each of the phosphor particles PR. It should be noted that as a method of forming the antireflection layer AR on the phosphor particles PR, there can be cited ALD (Atomic Layer Deposition), and a method of performing sputter-coating on the surface of each of the phosphor particles PR with the antireflection layer AR using a gas while rotating a polygonal barrel containing a powder.

The paste preparation step S1 and the phosphor mixing step S2A correspond to the preparation step.

Out of these steps S1, S2A, in the phosphor mixing step S2A, the glass paste prepared in the paste preparation step S1 and the particles PA as the phosphor particles PR provided with the antireflection layers AR in the layer forming step SA are mixed with each other so that the ratio between the phosphor particles PR and the binder constituent becomes the ratio described above.

The printing plate forming step S3, the coating step S4, the drying step S5, the calcination step S6, and the cooling step S7 are substantially the same as the steps S3 through S7, respectively, in the method of manufacturing the wavelength conversion element 51 described above. Specifically, the calcination temperature in the calcination step S6 is a temperature no lower than 800° C. as a temperature 100° C. or more higher than the softening point of the borosilicate glass as the binder constituent, and is preferably no lower than 800° C. and no higher than 1000° C. Further, the viscosity of the borosilicate glass when calcined at such a calcination temperature is no higher than $10^6$ dPa·s ($=10^6$ P).

Due to the manufacturing method including the steps SA, and S1 through S7 described hereinabove, there is manufactured the wavelength conversion element 51A having the phosphor layer 56 the area proportion and the glass content rate of which are higher than 0% and no higher than 10%.

Advantages of Second Embodiment

According to the projector related to the present embodiment described hereinabove, the advantages substantially the same as those of the projector 1 described in the first embodiment can be exerted.

Specifically, the projector according to the present embodiment is provided with the light source device 4, the light modulation devices 343 (343B, 343G, and 343R) for modulating the light emitted from the light source device 4 in accordance with the image information, and the projection optical device 36 for projecting the light modulated by the light modulation devices 343. The light source device 4 is provided with the light source 411 for emitting the excitation light, and the wavelength conversion element 51A for performing the wavelength conversion on the excitation light to generate the fluorescence having a longer wavelength than the wavelength of the excitation light. The wavelength conversion element 51A is provided with the phosphor layer 56 having the plurality of phosphor particles PR, and the binder BN for binding one phosphor particle PR (PR3) and the other phosphor particle PR (PR4) adjacent to each other out of the plurality of phosphor particles PR, and the antireflection layer AR disposed on the surface of each of the phosphor particles PR, and the substrate 52 on which the phosphor layer 56 is disposed. The binder BN includes the glass. The binder BN binds at least any one of the pairs of a part of the surface of one phosphor particle PR (PR3) and a part of the surface of the other phosphor particle PR (PR4), the antireflection layer AR disposed on the surface of the one phosphor particle PR (PR3) and the antireflection layer AR disposed on the surface of the other phosphor particle PR (PR4), and a part of the surface of the one phosphor particle PR (PR3) and the antireflection layer AR disposed on the surface of the other phosphor particle PR (PR4).

According to such a configuration, the binder BN is not bonded to the entire surface of each of the particles PA, namely the entire surface of each of the phosphor particles PR, but is bonded to only a part of the surface in each of the phosphor particles PR. This makes it possible to reduce the area of the binding part B2 to be bonded to the binder BN in the surface of the phosphor particle PR. In other words, it is possible to increase the area of the region having contact with the void SP (air) in the surface of the phosphor particle PR. Thus, since it is possible to decrease the intensity of the fluorescence propagating the binder BN, it is possible to decrease the spread of the light emitted from the phosphor layer 56, and by extension, from the wavelength conversion element 51A. Therefore, it is possible to enhance the brightness in the optical device 30 as the optical system, and thus, it is possible to increase the optical system efficiency described above.

Further, on the surface of the phosphor particle PR, there is disposed the antireflection layer AR. According to this configuration, it is possible to make the excitation light entering the wavelength conversion element 51A easy to enter the phosphor particles PR, and thus, it is possible to reduce the intensity of the excitation light which is reflected by the surface of the phosphor particle PR and fails to be converted by the phosphor particle PR into the fluorescence. Therefore, it is possible to enhance the wavelength conversion efficiency of the wavelength conversion element 51A, and thus, it is possible to increase the intensity of the fluorescence to be emitted from the wavelength conversion element 51A compared to the wavelength conversion element having the phosphor layer in which the phosphor particles PR not provided with the antireflection layer AR are bound to each other.

The method of manufacturing the wavelength conversion element includes the layer forming step of forming the antireflection layer on the surface of the plurality of phosphor particles, the preparation step of preparing the mixture obtained by mixing the plurality of phosphor particles the surfaces of which are provided with the antireflection layers are formed and the binder including the glass with each other, the coating step of applying the mixture on the substrate, the calcination step of calcining the substrate coated with the mixture, and the calcination temperature in the calcination step is 100° C. or more higher than the softening point of the glass. Specifically, the method of manufacturing the wavelength conversion element 51A includes the layer forming step SA, the paste preparation step S1 and the phosphor mixing step S2A as the preparation step, the coating step S4, and the calcination step S6. In the layer forming step SA, there is formed the antireflection layer AR on the surface of each of the phosphor particles PR. In the paste preparation step S1 and the phosphor mixing step S2A, there is prepared the mixture paste as the mixture obtained by mixing the binder including the glass and the phosphor particles PR provided with the antireflection layers AR with each other. In the coating step S4, the mixture paste is applied on the substrate 52. In the calcination step S6, the substrate 52 coated with the mixture paste is calcined. Further, the calcination temperature in the calcination step S6 is 100° C. or more higher than the softening point of the glass.

In other words, the method of manufacturing the wavelength conversion element includes the layer forming step of forming the antireflection layer on the surface of the plurality of phosphor particles, the preparation step of preparing the mixture obtained by mixing the plurality of phosphor particles the surfaces of which are provided with the antireflection layers are formed and the binder including the glass with each other, the coating step of applying the mixture on the substrate, the calcination step of calcining the substrate coated with the mixture, and the viscosity of the glass in the calcination step is no higher than $10^6$ dPa·s. Specifically, the method of manufacturing the wavelength conversion element 51A includes the layer forming step SA, the paste preparation step S1, the phosphor mixing step S2A, the coating step S4, and the calcination step S6 described above, and the viscosity of the glass in the calcination step S6 is no higher than $10^6$ dPa·s.

Modifications of Embodiments

The present disclosure is not limited to each of the embodiments described above, but includes modifications, improvements, and so on within the range in which the advantages of the present disclosure can be achieved.

In the first embodiment described above, it is assumed that the antireflection layer 55 is disposed on the first surface 541 which the excitation light enters in the phosphor layer 54. In detail, it is assumed that the antireflection layer 55 is disposed in substantially the entire area of the first surface 541. However, this is not a limitation, and it is also possible for the antireflection layer 55 to be disposed in a range where the incident area of the excitation light is included in the first surface 541.

Further, it is sufficient for the antireflection layer 55 to be disposed on the incident side of the excitation light with respect to the phosphor layer 54, and it is also possible to dispose another layer between the antireflection layer 55 and the phosphor layer 54.

Further, it is assumed that the antireflection layer 55 is formed on the first surface 541 by vapor deposition. However, the vapor deposition is not a limitation, it is possible to provide the antireflection layer 55 to the phosphor layer 54 using a different method.

In the second embodiment described above, it is assumed that the antireflection layer AR is formed so as to cover the surface of the phosphor particle PR using CVD. However, this is not a limitation, and the method of forming the antireflection layer AR can arbitrarily be selected.

Further, it is not required to provide the antireflection layer AR to all of the phosphor particles PR constituting the phosphor layer 56. In other words, providing the phosphor particle PR provided with the antireflection layer AR is included in the phosphor layer 56, it is possible to include the phosphor particle PR not provided with the antireflection layer AR.

In the first embodiment, it is assumed that the antireflection layer 55 is provided to the phosphor layer 54, and in the second embodiment, it is assumed that the antireflection layer AR is disposed on the surface of the phosphor particle PR. It is also possible to combine such a configuration described in the first embodiment and such a configuration described in the second embodiment with each other. For example, it is possible to adopt the wavelength conversion element in which the antireflection layer 55 is provided to the phosphor layer including the phosphor particles PR the surfaces of which are provided with the antireflection layers AR.

In each of the embodiments described above, it is assumed that the dimension in the X axis of the binding part B1, B2 to be bonded to the binder BN in the surface of the phosphor particle PR is no larger than ¼ of the diameter of the phosphor particle PR, and the dimension in the Y axis of the binding part B1, B2 is no larger than ¼ of the diameter of the phosphor particle PR. However, this is not a limitation, and the size of the binding part B1, B2 is not limited to the above providing the proportion of the area of the binding part B1, B2 to the surface area of the phosphor particle PR becomes a value no higher than 10%, and preferably becomes a value no lower than 3% and no higher than 5%.

Further, when the dimension in the X axis and the dimension in the Y axis of the binding part B1, B2 each become no larger than ¼ of the diameter of the phosphor particle PR, it is not required for the proportion of the area of the binding part B1, B2 to the surface area of the phosphor particle PR to become a value no higher than 10%, or preferably become a value no lower than 3% and no higher than 5%.

Further, it is also possible for the dimension in one of the X axis and the Y axis of the binding part B1, B2 to exceed ¼ of the diameter of the phosphor particle PR.

In each of the embodiments described above, it is assumed that the glass content rate of the phosphor layer 54, 56 is higher than 0 vol % and no higher than 10 vol %. In other words, it is assumed that the proportion of the volume of the binder BN to the total volume of the sum of the volumes of the phosphor particles PR and the sum of the volumes of the binder BN is larger than 0 vol % and no larger than 10 vol %. However, this is not a limitation, and the proportion of the volume can exceed 10 vol % within a range in which it is determined that the optical system efficiency is sufficiently high. It should be noted that the proportion of the volume is a value when manufacturing the phosphor layer 54, 56 as described above.

In the first embodiment described above, it is assumed that the method of manufacturing the wavelength conversion element 51 includes the paste preparation step S1, the phosphor mixing step S2, the printing plate forming step S3, the coating step S4, the drying step S5, the calcination step S6, the cooling step S7, and the layer forming step S8. In the second embodiment described above, it is assumed that the method of manufacturing the wavelength conversion element 51A includes the layer forming step SA, the paste preparation step S1, the phosphor mixing step S2A, the printing plate forming step S3, the coating step S4, the drying step S5, the calcination step S6, and the cooling step S7. However, the method of manufacturing the wavelength conversion element is not limited to the above, and it is also possible to eliminate any of the steps S1 through S8, or any of the steps SA, S1, S2A, and S3 through S7. For example, the drying step S5 can be eliminated. Further, the paste preparation step S1 and the phosphor mixing step S2 can be executed at the same time.

In each of the embodiments described above, it is assumed that the viscosity of the glass in the calcination step S6 is a value no higher than $10^6$ dPa·s. In other words, it is assumed that the calcination temperature is made 100° C. or more higher than the softening point of the glass so that the viscosity of the glass takes a value no higher than $10^6$ dPa·s. However, this is not a limitation, and the calcination temperature is not required to be 100° C. or more higher than the softening point of the glass to be the binder BN providing the viscosity of the glass takes a value no higher than $10^6$ dPa·s. In contrast, when the calcination temperature is 100° C. or more higher than the softening point of the glass, the viscosity of the glass to be the binder BN is not required to be no higher than $10^6$ dPa·s in the calcination step S6. In other words, it is sufficient to satisfy at least either one of the fact that the calcination temperature is 100° C. or more higher than the softening point of the glass, and the fact that the viscosity of the glass is no higher than $10^6$ dPa·s in the calcination step S6.

In each of the embodiments described above, there is illustrated the reflective wavelength conversion element 51, 51A in which the phosphor layer 54, 56 is located on the incident side of the excitation light with respect to the substrate 52, and the fluorescence is emitted on the incident side of the excitation light. However, this is not a limitation, and it is also possible to apply the present disclosure to a transmissive wavelength conversion element for emitting the fluorescence along the incident direction of the excitation light. In the case of the transmissive wavelength conversion element, sapphire is preferably used as the substrate.

Further, a dielectric multilayer film for reflecting the light emitted from the phosphor layer 54, 56 can also be disposed between the phosphor layer 54, 56 and the substrate 52.

In each of the embodiments described above, it is assumed that the wavelength conversion element 51 has the configuration of being rotated by the rotary section RT. However, this is not a limitation, and it is also possible to adopt a configuration in which the wavelength conversion element is not rotated. In other words, the wavelength conversion device is not required to be provided with the rotary section RT for rotating the wavelength conversion element. In this case, the phosphor layer 54, 56 is not required to be formed to have an annular shape when viewed from the incident side of the excitation light, and can also be formed to have, for example, a circular shape or a polygonal shape. Further, the shape of the phosphor layer 54, 56 can also be a circular shape or a polygonal shape when viewed from the incident side of the excitation light irrespective of whether or not the phosphor layer 54, 56 is rotated.

In each of the embodiments described above, it is assumed that the projector is equipped with the three light modulation devices 343 (343B, 343G and 343R). However, this is not a limitation, and the present disclosure can also be applied to a projector equipped with two or less, or four or more light modulation devices.

In each of the embodiments described above, it is assumed that the projector is provided with the light modulation devices 343 each having the transmissive type liquid crystal panel having the plane of incidence of light and the light exit surface different from each other. However, this is not a limitation, but it is also possible to adopt a configuration in which the light modulation devices each have a reflective type liquid crystal panel having the plane of incidence of light and the light exit surface coinciding with each other. Further, it is also possible to use a light modulation device other than the liquid crystal device such as a device using a micromirror such as a digital micromirror device (DMD) providing the light modulation device is capable of modulating the incident light beam to form the image corresponding to the image information.

In each of the embodiments described above, there is cited an example in which the light source device 4 is applied to the projector. However, this is not a limitation, and it is also possible for the light source device according to the present disclosure to be adopted in, for example, lighting equipment, and a spotlight or the like of a vehicle or the like. Further, the light source device according to the present disclosure is not limited to the configuration of the light source device 4, and providing the light source device has a configuration provided with the wavelength conversion element and the light source for emitting the light which enters the wavelength conversion element, other components constituting the light source device can arbitrarily be changed. Substantially the same is applied to the projector according to the present disclosure.

What is claimed is:

1. A wavelength conversion element comprising:
a phosphor layer having a plurality of phosphor particles and a binder that binds one of the phosphor particles adjacent to another one of the phosphor particles;
an antireflection layer on a side of the phosphor layer where excitation light is incident; and
a substrate provided with the phosphor layer, wherein
the binder includes glass,
the binder binds a part of a surface of the one of the phosphor particles and a part of a surface of the other one of the phosphor particles to each other, and
each of the one of the phosphor particles and the other one of the phosphor particles has part of the surface which is not bound to the binder.

2. The wavelength conversion element according to claim 1, wherein
a proportion of a volume of the binder to a total volume of a sum of volumes of the phosphor particles and a sum of volumes of the binder is larger than 0 vol % and no larger than 10 vol %.

3. A light source device comprising:
the wavelength conversion element according to claim 2; and
a light source configured to emit excitation light to the wavelength conversion element.

4. A projector comprising:
the light source device according to claim 3;
a light modulation device configured to modulate light emitted from the light source device in accordance with image information; and
a projection optical device configured to project the light modulated by the light modulation device.

5. A light source device comprising:
the wavelength conversion element according to claim 1; and
a light source configured to emit excitation light to the wavelength conversion element.

6. A projector comprising:
the light source device according to claim 5;
a light modulation device configured to modulate light emitted from the light source device in accordance with image information; and
a projection optical device configured to project the light modulated by the light modulation device.

7. The wavelength conversion element according to claim 1, wherein
each of the one of the phosphor particles and the other one of the phosphor particles has part of the surface which is not bound to the binder due to voids in the binder.

8. A wavelength conversion element comprising:
a phosphor layer having a plurality of phosphor particles, a binder, and a respective antireflection layer on a surface of each of the plurality of phosphor particles; and
a substrate provided with the phosphor layer, wherein
the binder includes glass,
the binder binds a part of the antireflection layer on the surface of one of the phosphor particles and a part of the antireflection layer on the surface of the other of the phosphor particles to each other, and
each of the one of the phosphor particles and the other one of the phosphor particles has part of the surface which is not bound to the binder.

9. The wavelength conversion element according to claim 8, wherein
a proportion of a volume of the binder to a total volume of a sum of volumes of the phosphor particles and a sum of volumes of the binder is larger than 0 vol % and no larger than 10 vol %.

10. A light source device comprising:
the wavelength conversion element according to claim 9; and
a light source configured to emit excitation light to the wavelength conversion element.

11. A projector comprising:
the light source device according to claim 10;
a light modulation device configured to modulate light emitted from the light source device in accordance with image information; and
a projection optical device configured to project the light modulated by the light modulation device.

12. A light source device comprising:
the wavelength conversion element according to claim 8; and
a light source configured to emit excitation light to the wavelength conversion element.

13. A projector comprising:
the light source device according to claim 12;
a light modulation device configured to modulate light emitted from the light source device in accordance with image information; and
a projection optical device configured to project the light modulated by the light modulation device.

14. The wavelength conversion element according to claim 8, wherein
each of the one of the phosphor particles and the other one of the phosphor particles has part of the surface which is not bound to the binder due to voids in the binder.

15. A wavelength conversion element comprising:
a phosphor layer having a plurality of phosphor particles, a binder, and a respective antireflection layer on a surface of each of the plurality of phosphor particles; and
a substrate provided with the phosphor layer, wherein
the binder includes glass,
the binder binds a part of the surface of a first one of the phosphor particles and a part of the antireflection layer on the surface of a second one of the phosphor particles to each other, and
each of the first one of the phosphor particles and the second one of the phosphor particles has part of the surface which is not bound to the binder.

16. The wavelength conversion element according to claim 15, wherein
the binder binds a part of the surface of a third one of the phosphor particles and a part of the surface of a fourth one of the phosphor particles to each other, and
each of the third one of the phosphor particles and the fourth one of the phosphor particles has part of the surface which is not bound to the binder.

17. The wavelength conversion element according to claim 15, wherein
each of the one of the phosphor particles and the other one of the phosphor particles has part of the surface which is not bound to the binder due to voids in the binder.

18. A light source device comprising:
the wavelength conversion element according to claim 15; and
a light source configured to emit excitation light to the wavelength conversion element.

19. A projector comprising:
the light source device according to claim 18;
a light modulation device configured to modulate light emitted from the light source device in accordance with image information; and
a projection optical device configured to project the light modulated by the light modulation device.

* * * * *